United States Patent
Krapsch et al.

(10) Patent No.: US 9,388,533 B2
(45) Date of Patent: *Jul. 12, 2016

(54) METHOD FOR INCREASING THE ADVANTAGES OF STRENGTH AIDS IN THE PRODUCTION OF PAPER AND PAPERBOARD

(75) Inventors: Ludwig Krapsch, Winterthur (AT); Christopher John McGregor, Chester (GB); Jean Victor Mallard de la Varende, Boulogne Billancourt (FR)

(73) Assignee: Solenis Technologies, L.P. (CH)

( * ) Notice: Subject to any disclaimer, the term of this patent is extended or adjusted under 35 U.S.C. 154(b) by 88 days.

This patent is subject to a terminal disclaimer.

(21) Appl. No.: 14/240,854

(22) PCT Filed: Aug. 24, 2012

(86) PCT No.: PCT/EP2012/003582
§ 371 (c)(1),
(2), (4) Date: Jun. 12, 2014

(87) PCT Pub. No.: WO2013/026578
PCT Pub. Date: Feb. 28, 2013

(65) Prior Publication Data
US 2014/0284011 A1    Sep. 25, 2014

(30) Foreign Application Priority Data
Aug. 25, 2011 (EP) .................................... 11006948
Feb. 24, 2012 (EP) .................................... 12001249

(51) Int. Cl.
*D21H 17/37* (2006.01)
*D21C 5/02* (2006.01)
(Continued)

(52) U.S. Cl.
CPC .................. *D21H 17/37* (2013.01); *D21C 5/02* (2013.01); *D21H 17/28* (2013.01); *D21H 21/36* (2013.01); *D21H 17/375* (2013.01); *D21H 21/18* (2013.01); *D21H 21/20* (2013.01); *Y02W 30/648* (2015.05)

(58) Field of Classification Search
USPC ...................... 162/158, 161, 160, 166, 164.1, 162/168.1–168.3, 175–177, 185, 24, 26, 49, 162/196
See application file for complete search history.

(56) References Cited

U.S. PATENT DOCUMENTS 6,103,861 A * 8/2000 Staib ..................... C08F 220/56
524/602
7,008,545 B2 * 3/2006 Cronan, Jr. ............. A01N 59/00
162/161
(Continued)

FOREIGN PATENT DOCUMENTS

DE    2433325         1/1976
DE    3506832 A *     8/1986
(Continued)

OTHER PUBLICATIONS

Smook, Gary A., Handbook for Pulp and Paper Technologists, 2nd ed, Angus Wilde Publications, 1992, pp. 194-208, 220.*

(Continued)

*Primary Examiner* — Dennis Cordray
(74) *Attorney, Agent, or Firm* — Joanne Rossi; Michael J Herman

(57) ABSTRACT

The invention relates to a method for manufacturing paper, paperboard or cardboard comprising the steps of
(a) pulping an aqueous cellulosic material containing a starch;
(b) preventing at least a portion of the starch from being microbially degraded by treating the aqueous cellulosic material containing the starch with one or more biocides; and
(h) adding a dry and/or wet strength polymer to the cellulosic material.

18 Claims, 5 Drawing Sheets

(51) Int. Cl.
  *D21H 17/28*  (2006.01)
  *D21H 21/36*  (2006.01)
  *D21H 21/18*  (2006.01)
  *D21H 21/20*  (2006.01)

(56) References Cited

U.S. PATENT DOCUMENTS

| | | | |
|---|---|---|---|
| 8,419,899 B2 * | 4/2013 | Xia | D21H 21/36 162/161 |
| 8,758,562 B2 * | 6/2014 | Krapsch | D21H 17/28 162/161 |
| 2004/0171719 A1 | 9/2004 | Neivandt et al. | |
| 2005/0155731 A1 | 7/2005 | Martin et al. | |
| 2006/0289139 A1 | 12/2006 | Zhang et al. | |

FOREIGN PATENT DOCUMENTS

| | | |
|---|---|---|
| EP | 0361763 | 9/1989 |
| WO | 0136740 | 5/2001 |
| WO | 0188265 | 11/2001 |
| WO | 2005042843 | 5/2005 |
| WO | 2006014426 | 2/2006 |
| WO | 2006060784 | 6/2006 |
| WO | 2009059888 | 5/2009 |
| WO | WO 2013/045638 A1 * | 4/2013 |

OTHER PUBLICATIONS

Espy, R. "The mechanism of wet-strength development in paper: a review", Tappi Journal, vol. 78, No. 4, 1995, pp. 90-99.*
English translation of DE 3506832 A1, 1986, European Patent Office, <URL:http://worldwide.espacenet.com/publicationDetails/description?CC=JP&NR=S61201097A&KC=A&FT=D&ND=3&date=19860905&DB=worldwide.espacenet.com&locale=en_EP>.*
Smook, Gary A., Handbook of Pulp and Paper Terminology, Angus Wilde Publications, 1990, pp. 55 and 63.*
International Search Report, PCT/EP2012/003582, Nov. 10, 2012.

* cited by examiner

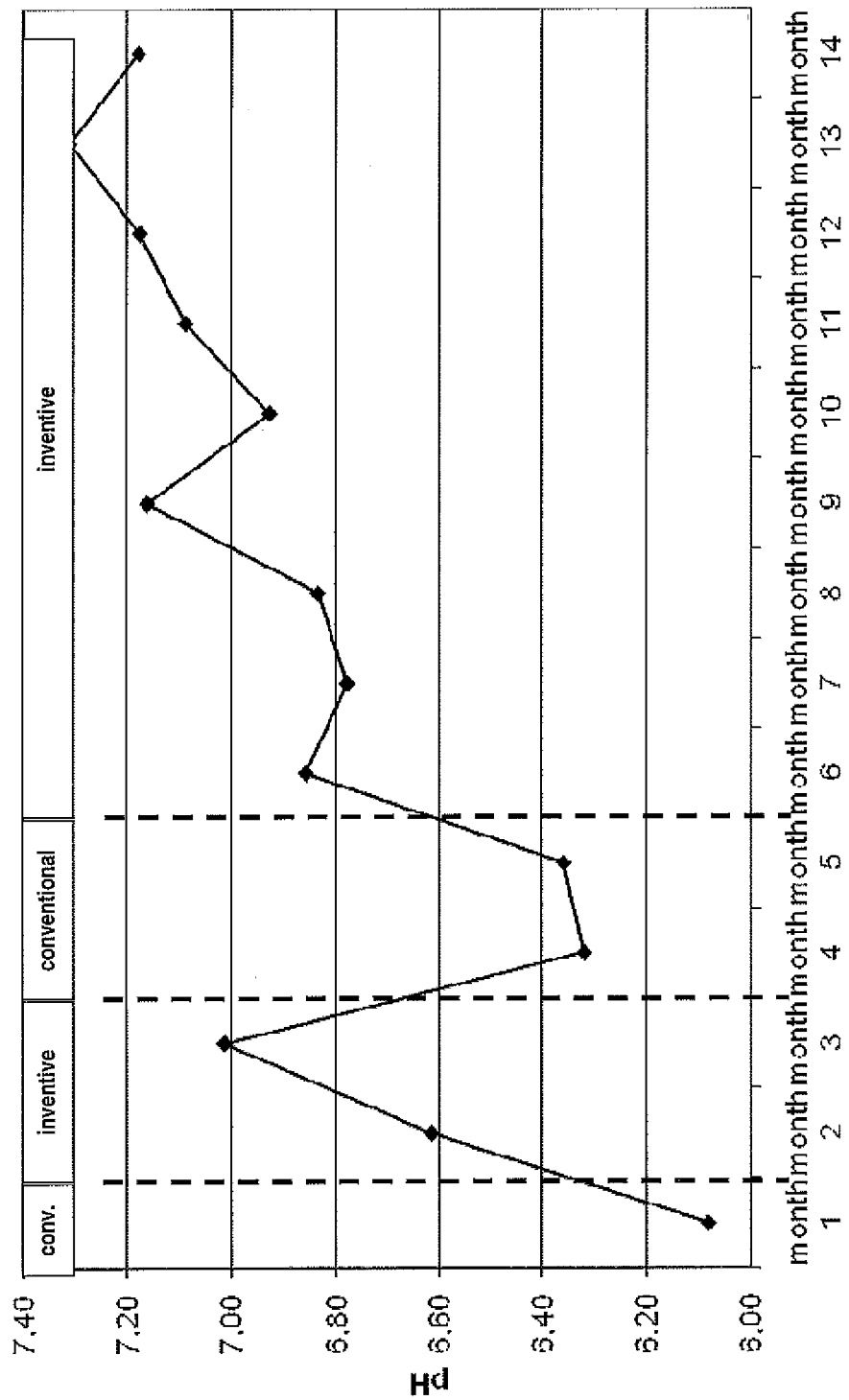

METHOD FOR INCREASING THE ADVANTAGES OF STRENGTH AIDS IN THE PRODUCTION OF PAPER AND PAPERBOARD

The invention claims the benefit of PCT/EP2012/003582, filed 24 Aug. 2012, the entire contents of which are hereby incorporated by reference.

FIELD OF THE INVENTION

The invention relates to a method for manufacturing paper, paperboard or cardboard comprising the steps of
(a) pulping an aqueous cellulosic material containing a starch;
(b) preventing at least a portion of the starch from being microbially degraded by treating the aqueous cellulosic material containing the starch with one or more biocides, which are at least partially added to the cellulosic material in the thick stock area, where the cellulosic material has a stock consistency of at least 2.0%; and
(h) adding a dry and/or wet strength polymer to the cellulosic material.

Further, the invention relates to a method to increase the strength of paper, paperboard or cardboard, preferably the dry strength and/or the wet strength, comprising steps (a), (b) and (h) as described above.

BACKGROUND

Strengths polymers (also referred to as strength resins, strength aids, strength additives and the like) are extensively utilized in paper manufacture. It is often distinguished between dry strength polymers and wet strength polymers, though dry strength polymers often impart a certain degree of wet strength to the paper, and vice versa. Today, the most common types of synthetic dry and/or wet strength polymers are based on polyvinylamine or polyacrylamide. Other resins such as polyvinyl alcohol or lattices are used, but generally these are seen in surface applications to the paper, rather than as wet-end additives. Similarly, styrene acrylic resins have shown superior performance when applied through surface application rather than as stock additives.

A number of polymers are commercially available as dry or wet strength polymers. They can be classified in the following three categories:
(i) Polymers capable of only forming hydrogen bonds to starch and/or cellulose fibers, such as certain polyacrylamides, usually do not provide significant degrees of wet strength but can improve the dry strength of paper.
(ii) Polymers capable of additionally forming ionic bonds to starch and/or cellulose fibers, such as highly cationic polyvinylamines, can provide dry strength and some permanent wet strength to the paper.
(iii) Polymers capable of covalently bonding to the cellulose fibers, such as glyoxylated polyacrylamide and epichlorohydrin polyamido-polyamines, achieve dry strength and temporary or permanent wet strength of paper.

The cross-linking agents provide wet strength as well as dry strength properties. This material forms a covalent bond with the hydroxyl group on cellulose, and is widely used in applications where wet strength is tolerated and desired.

The wet strength achieved with epichlorohydrin functionalized polymers is of permanent nature, while the wet strength achieved with glyoxylated polyacrylamide is of a temporary nature, losing effectiveness during prolonged exposure to water. This enables re-pulping of broke or waste paper to be readily achieved without special treatment. The dry strength obtained is often greater than that achieved with other conventional strength resins, polyvinyl alcohol, starches or gums.

The glyoxylated polymers typically are less effective in systems where there are high levels of anionics (e.g. anionic trash), such as secondary fiber furnishes. Here the resin complexes with both soluble and insoluble materials, thus reducing the adsorption of the resin onto the fibers. This can be overcome by the addition of cationic promoters (e.g. alumn or polyaluminium chloride), or by careful charge control using other chemical additives in the furnish, such as polyamide wet strength resins or cationic sizes (I. Thorn et al., Applications of Wet-End Paper Chemistry, 2nd edition, Springer, 2009).

Dry and/or wet strength resins are not satisfactory in every respect, particularly because they do not always show optimal performance, particularly in papermaking plants having partially or fully closed water circuits.

Native or chemically modified starch is also extensively utilized in paper manufacture. It has been reported that for production of woodfree uncoated and coated fine papers up to 40 kg starch per ton of paper are applied. Packaging paper made from 100% recovered paper can only be produced economically and in the required quality by adding cost effective biosynthetic starch products. Therefore, these papers are produced with an average starch consumption of 40 kg $t^{-1}$, mainly by surface application. A further 25 kg $t^{-1}$ is applied as an adhesive in the converting plant. This means that a high amount of starch is typically returned to the production process via recovered papers, where conventionally it is nearly not retained in the paper sheet. Therefore, this uncontrolled starch quantity leads to a considerable load in the white water circuit (usual COD levels from 5,000 to 30,000 mg $O_2$ $l^{-1}$) and finally also in the waste water (cf. H Holik, Handbook of paper and board, Wiley-VCH Verlag GmbH & Co. KGaA, 1st ed, 2006, Chapter 3.4.3).

Starch that is released in the wet end of a papermaking machine by the pulping of waste paper or broke is not fixed to fiber except through natural retention and it does not usually contribute to strength parameters.

WO 01/36740 A2 discloses methods of making paper or paperboard. In one method, at least one cellulytic enzyme composition and at least one cationic polymer composition are introduced to a paper making pulp at about the same time to form a treated pulp.

EP 0,361,763 A2 discloses a composition for flocculating paper- or boardmaking filler comprising particles of starch in aqueous suspension, and a flocculating agent, e.g. a polyacrylamide.

WO 2005/042843 A1 discloses a papermaking process, wherein a first strength agent is added to a stock suspension containing pulp and optionally other additives prior to its being formed into a web at the wet end of a papermaking machine.

DE 24 33 325 A1 discloses a process for the manufacture of paper and cardboard from waste paper in closed circuits.

WO 2006/060784 A2 discloses an aqueous printing ink and coating composition containing colorant, one or more high molecular weight starches and one or more water soluble acrylic polymers or co-polymers.

US 2006/289139 A1 discloses a method of improving retention and drainage in a papermaking process. The method provides for the addition of an associative polymer, starch or a starch derivative and optionally a siliceous material to the papermaking slurry.

US 2005/155731 A1 discloses a papermaking process, wherein a first strength agent is added to a stock suspension containing pulp and optionally other additives prior to its being formed into a web at the wet end of a papermaking machine.

WO 2009/059888 A1 discloses fiber products, comprising in their body at least 20% by weight of cellulose fibers, and adequate amounts of an acid and a cationic retention aid for the acid, that can be marked by means of a laser beam.

WO 2006/014426 A1 relates to the manufacture of insulation paper facing having improved reduction or inhibition in the growth of mold and/or fungus.

US 2004/171719 A1 discloses a starch composition that is made by cooking a starch and combining the cooked starch with a polymer, the polymer containing anionic groups or potential anionic groups.

There is a demand for a method for manufacturing paper, paperboard or cardboard which has advantages compared to the methods of the prior art.

SUMMARY OF THE INVENTION

The invention relates to a method for manufacturing paper, paperboard or cardboard comprising the steps of
(a) pulping an aqueous cellulosic material containing a starch;
(b) preventing at least a portion of the starch from being microbially degraded by treating the aqueous cellulosic material containing the starch with one or more biocides, which are at least partially added to the cellulosic material in the thick stock area, where the cellulosic material has a stock consistency of at least 2.0%; and
(h) adding a dry and/or wet strength polymer to the cellulosic material.

Further, the invention relates to a method to increase the strength of paper, paperboard or cardboard, preferably the dry strength, comprising steps (a), (b) and (h) as described above.

It has been found that treating of waste paper or broke with a sufficient amount of a suitable biocide, e.g. an oxidizing and/or non-oxidizing biocide program, during or after pulping, can prevent microbiological degradation of starch contained in waste paper or broke thereby decreasing the electrical conductivity of the aqueous phase of the cellulosic material.

Surprisingly, at a thus relatively decreased electrical conductivity, the strength performance of dry and/or wet strength polymers such as cellulose reactive polymers bearing aldehyde functional groups can be substantially improved. Thus, it has been surprisingly found that when reducing the electrical conductivity by adding sufficient amounts of suitable biocides, the consumption of dry and/or wet strength polymers that are needed in order to achieve a desired dry strength of the paper, paperboard or cardboard, can be substantially decreased.

DETAILED DESCRIPTION OF THE INVENTION

Figure 1A:
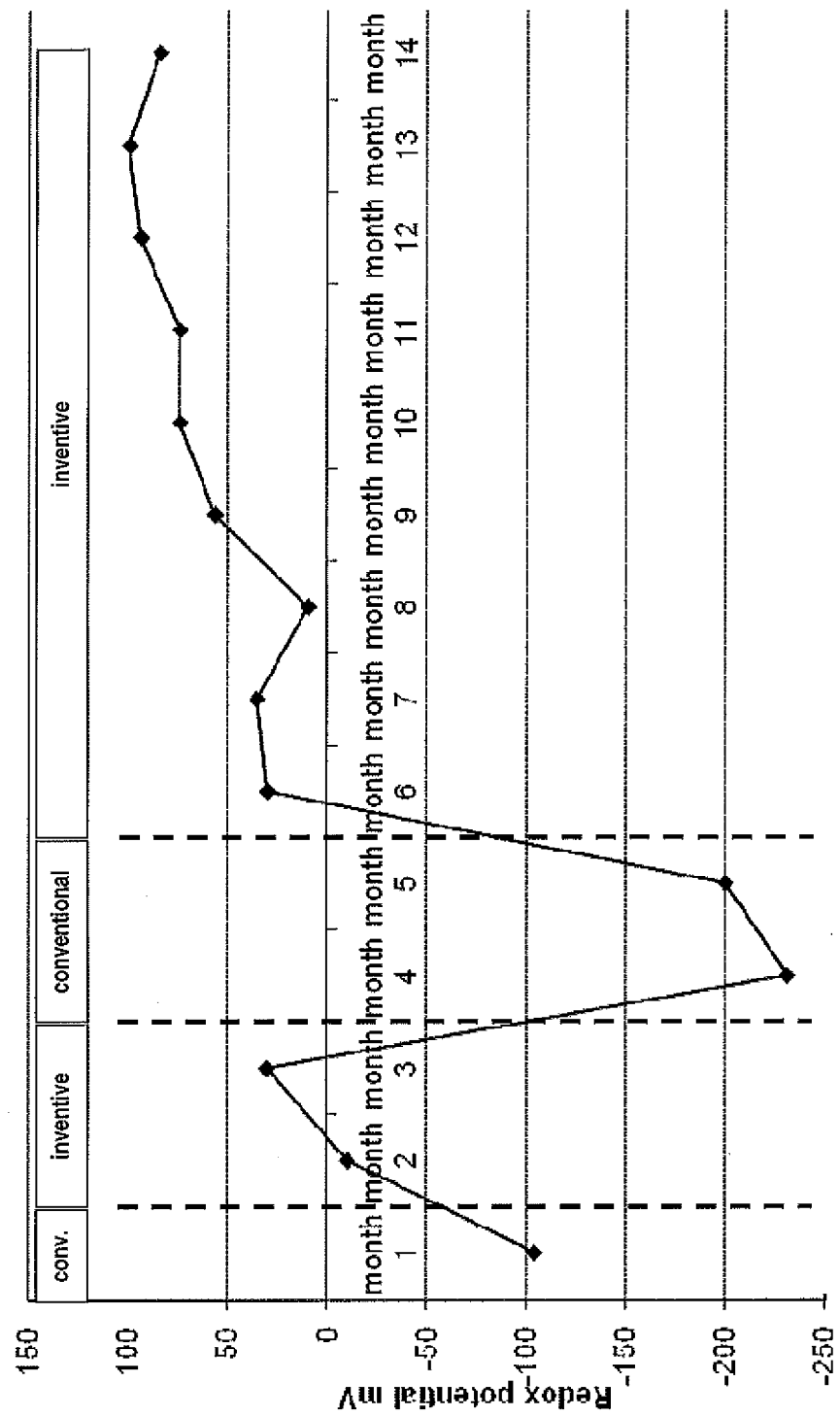
FIG. 1 shows the dependency of redox potential (FIG. 1A), pH value (FIG. 1B), and electrical conductivity (FIG. 1C) on the dosage of biocide in an experiment that was conducted on a paper mill.

The control of microbiological activity in papermaking machines with both oxidizing and non-oxidizing biocides is well documented. There is also wide spread literature on the use of starch as a dry and/or wet strength polymer and the use of synthetic dry and/or wet strength polymers which can be used either in addition to starch applied at both the wet end and on the surface of the paper sheet or as full or partial replacement of the starch.

The invention is concerned with the use of an effective biocide, e.g. an oxidizing and non-oxidizing microbiological control program, not only to prevent slime formation like in conventional paper manufacture, but to prevent the degradation of starch (nonionic/native/cationic/anionic) present from the pulping of waste paper or broke; in combination with the use of a dry and/or wet strength polymer, preferably of a cellulose reactive polymer bearing aldehyde functional groups, in order to improve paper strength, particularly dry strength and/or wet strength.

It has been found that microbial degradation of starch, which is released e.g. by pulping recycled waste furnish, causes a substantial increase of electrical conductivity, particularly in partially or fully closed water circuits. Further, it has been found that such starch degradation can be effectively prevented by means of suitable biocides in suitable amounts (amylase control). Surprisingly, the thus achieved reduction of electrical conductivity provides much better dry and/or wet strength performance of conventional dry and/or wet strength polymers such as glyoxylated polyacrylamides and other cellulose reactive polymers bearing aldehyde functional groups.

The invention relates to the use of a biocide, e.g. an oxidizing and/or non-oxidizing biocide, as the first step in preventing starch degradation by microbiological activity (amylase control), and the use of a dry and/or wet strength polymer in order to improve the dry and/or wet strength properties of the paper, paperboard or cardboard.

Thus, the method according to the invention features a two step approach: 1.) avoidance of microbiological starch degradation in board or papermaking machine approach flows with 2.) addition of dry and/or wet strength polymers providing a better performance because of the relatively low electrical conductivity achieved by step 1.).

A first aspect of the invention relates to a method
for treating a cellulosic material used to manufacture paper; and/or
for making a paper product; and/or
for manufacturing paper, paperboard or cardboard; and/or
to increase the strength of paper, paperboard or cardboard; preferably the dry strength and/or wet strength; and/or
to decrease the consumption of dry and/or wet strength polymer;
the method in each case comprising the steps of
(a) pulping an aqueous cellulosic material containing a starch;
(b) preventing at least a portion of the starch from being microbially degraded by treating the aqueous cellulosic material containing the starch with one or more biocides, which are at least partially added to the cellulosic material in the thick stock area, where the cellulosic material has a stock consistency of at least 2.0%; and
(c) optionally, de-inking the cellulosic material;
(d) optionally, blending the cellulosic material;

(e) optionally, bleaching the cellulosic material;
(f) optionally, refining the cellulosic material;
(g) optionally, screening and/or cleaning the cellulosic material in the thick stock area;
(h) adding a dry and/or wet strength polymer, preferably having a weight average molecular weight of at most 1,500,000 g/mol, more preferably at most 1,000,000 g/mol, still more preferably at most 500,000 g/mol, to the cellulosic material.
(i) optionally, screening and/or cleaning the cellulosic material in the thin stock area, i.e. after diluting the thick stock into a thin stock;
(j) optionally, forming a wet sheet from the cellulosic material;
(k) optionally, draining the wet sheet; and
(l) optionally, drying the drained sheet.

In a preferred embodiment, the water circuit of the papermaking plant on which the method according to the invention is performed is a recycle system, i.e. a closed system. In another preferred embodiment, the water circuit of the papermaking plant on which the method according to the invention is performed is an open system.

Preferably, step (b) is performed at least partially simultaneously with step (a) or after step (a). Preferably, step (h) is performed at least partially after step (a). Preferably, step (h) is performed at least partially after step (b).

For the purpose of the specification, the term "non-degraded starch" and the expression "preventing at least a portion of the starch from being microbially degraded" refers to any type of starch that preferably originates from waste paper or broke and in the course of the pulping preferably has essentially maintained its molecular structure. This does include slight degrees of degradation, but compared to conventional processes, the structure of the non-degraded starch does preferably substantially not change (in terms of microbiological degradation) during the pulping and papermaking processes.

In a preferred embodiment, the method according to the invention comprises the additional step of adding starch to the cellulosic material. Thus, in this embodiment, the starch that is processed in accordance with the invention preferably originates from two sources: the first source is the starting material, e.g. waste paper, already containing starch, and the second source is starch that is additionally added to the cellulosic material. The additionally added starch may be any type starch, i.e. native, anionic, cationic, non-ionic and the like. It may be added to the cellulosic material in the thick stock area or in the thin stock area. When it is added in the thick stock area, it is preferably added at the machine chest, more preferably to the outlet of the machine chest. Alternatively or additionally, the starch can be added at the size press. In a preferred embodiment, the starch is sprayed, e.g. in form of an aqueous solution, between the plies of a multi-ply paper, paperboard or cardboard.

The basic steps of paper manufacture are known to the skilled artisan. In this regard it can be referred to, e.g., C. J. Biermann, Handbook of Pulping and Papermaking, Academic Press; 2 edition (1996); J. P. Casey, Pulp and Paper, Wiley-Interscience; 3 edition (1983); and E. Sjöström et al., Analytical Methods in Wood Chemistry, Pulping and Papermaking (Springer Series in Wood Science), Springer; 1 edition (1999).

The raw material for paper is fiber. For the purpose of the specification, "pulping" is to be regarded as the process of separating the fibers, suitable for papermaking, from cellulosic material such as recovered (waste) paper.

Modern papermaking typically involves seven basic operations: 1) fiber pretreatment; 2) fiber blending; 3) furnish cleaning and screening; 4) slurry distribution and metering; 5) web formation and water removal by mechanical means; 6) web compaction and water removal by means of heat; and 7) sheet finishing, by means of calendering, sizing, coating, glazing, or converting of paper.

In practice, there are numerous variants of methods for manufacturing paper, paperboard or cardboard. All these variants have in common, however, that the overall method can be divided into the following sections which will be referred to the following to define preferred embodiments of the method according to the invention:
(I) measures taking place before pulping;
(II) measures associated with pulping;
(III) measures taking place after pulping but still outside the papermaking machine;
(IV) measures taking place inside the papermaking machine; and
(V) measures taking place after the papermaking machine.

Typically, sections (I) to (II) are concerned with the processing of a thick stock of cellulosic material, whereas during section (III) the cellulosic material is converted from a thick stock to a thin stock by dilution with water, and section (IV) is thus concerned with the processing of a thin stock of cellulosic material. All areas in which measures take place before dilution, preferably during step (III) are preferably referred to as the "thick stock area", whereas the remainder is preferably referred to as the "thin stock area".

In a preferred embodiment of the invention, the water used for pulping the cellulosic material containing the starch is brought in contact with at least a part of the biocide, optionally provided as aqueous composition, in section (I) of the method for the manufacture of paper, i.e. before pulping.

In another preferred embodiment of the invention, the cellulosic material containing the starch is brought in contact with at least a part of the biocide, optionally provided as aqueous composition, in section (II) of the method for the manufacture of paper, i.e. in the course of pulping. Section (II) encompasses step (a) of the method according to the invention, whereas the supply of the cellulosic material containing the starch into the pulping device (pulper) and its removal therefrom are usually not considered as belonging to the pulping step per se, but are at least partially encompassed by section (II) as well.

In still another preferred embodiment of the invention, the cellulosic material containing the starch is brought in contact with at least a part of the biocide, optionally provided as aqueous composition, in section (III) of the method for the manufacture of paper, i.e. after pulping but still outside the papermaking machine. Preferably, the biocide is added to the cellulosic material containing the starch in the thick stock area.

Preferably, pulping is the first step in paper manufacturing where the cellulosic material is brought into contact with substantial amounts of water thereby generating aqueous slurry, i.e. an aqueous suspension of cellulosic fibers, also referred to as pulp. Said pulp forms an intermediate, fibrous material for the manufacture of paper or paperboard.

The site of pulping is referred to as the pulper, i.e. a reaction vessel used for the manufacturing of an aqueous dispersion or suspension of the cellulosic material. Sometimes, a pulper is also referred to as a hydrapulper or hydropulper.

In case that recovered (waste) paper is used as the starting material for the paper manufacturing process, suitable recovered (waste) paper is typically directly introduced to the pulper. Waste paper may be also mixed with a quantity of virgin material to improve the quality of the cellulosic material.

For the purpose of the specification, the term "cellulosic material" refers to any material comprising cellulose including recovered (waste) paper. Further, the term "cellulosic material" refers to all intermediate and final products during the paper making process, which originate from recovered (waste) paper, such as dispersions or suspensions of cellulosic material, pulped cellulosic material, de-inked cellulosic material, blended cellulosic material, bleached cellulosic material, refined cellulosic material, screened cellulosic material and the final paper, paperboard or cardboard. Therefore, the term "cellulosic material" encompasses pulp, slurry, sludge, stock, and the like.

The starch contained in the cellulosic material does not necessarily originate from the cellulose starting material (recycled material and the like). It is also possible that the entire amount of cellulose starting material is virgin material not containing any starch and that the starch contained in the cellulosic material originates from another source, preferably from a recirculation unit supplying the pulper with recycle water from the wet end of the papermaking machine.

In a preferred embodiment, the cellulosic material containing the starch originates from waste paper or broke, but may be blended with e.g. virgin material (=>recycle pulp and blended pulp, respectively).

In a preferred embodiment, the starch content of the cellulosic material containing the starch, i.e. the waste paper or broke that is employed as starting material, is at least 0.1 wt.-%, more preferably at least 0.25 wt.-%, or at least 0.5 wt.-%, or at least 0.75 wt.-%, or at least 1.0 wt.-%, or at least 1.5 wt.-%, or at least 2.0 wt.-%, or at least 3.0 wt.-%, or at least 5.0 wt.-%, or at least 7.5 wt.-%, or at least 10 wt.-%, or at least 15 wt.-%, based on the weight of dry cellulosic material.

In another preferred embodiment, the starch is added to the cellulosic material, e.g. to virgin material, in the course of paper manufacture, preferably in the thick stock area. Preferably, a portion of the freshly added starch is fixated to the cellulosic fibers before the web is formed and the water is drained off. Due to recirculation of at least a portion of the water drained from the pulp, another portion of the starch is returned to the beginning of the overall process. Thus, the starch does not necessarily originate from waste paper, but may alternatively or additionally also originate from the method itself.

According to the invention, the cellulosic material contains a starch. For the purpose of the specification, the term "starch" refers to any modified or non-modified starch typically employed in paper manufacture. Starch is a polysaccharide carbohydrate consisting of a large number of glucose units joined together by glycosidic bonds. Starch is produced by all green plants as an energy store. Starch is composed of two types of molecules: the linear and helical amylose and the branched amylopectin. Depending on the origin, native starch usually contains 20 to 25% amylose and 75 to 80% amylopectin. By physical, enzymatic or chemical treating native starch, a variety of modified starches can be prepared, including non-ionic, anionic and cationic starches.

Preferably, the starch contained in the cellulosic material has an amylose content within the range of from 0.1 wt.-% to 95 wt.-%.

In a preferred embodiment of the invention, the starch contained in the cellulosic material is substantially pure amylose, i.e. has an amylose content of about 100 wt.-%. In another preferred embodiment of the invention, the starch contained in the cellulosic material is substantially pure amylopectin, i.e. has an amylopectin content of about 100 wt.-%. In still another preferred embodiment, the amylose content is within the range of 22.5±20 wt.-%, whereas the amylopectin content is preferably within the range of 77.5±20 wt.-%.

In a preferred embodiment, the starch is non-ionic, preferably native starch. In another preferred embodiment, the starch is anionic. In still another preferred embodiment, the starch is cationic. In yet another preferred embodiment, the starch contains both charges, anionic as well as cationic, whereas the relative content may be balanced, dominated by anionic charges or dominated by cationic charges.

In a preferred embodiment, the starch that is contained in the cellulosic material, preferably before pulping, has a weight average molecular weight of at least 25,000 g/mol.

In a preferred embodiment, the relative weight ratio of the starch and the cellulosic material (solid contents) is within the range of 1:(20±17.5) or 1:(50±40) or 1:(100±90) or 1:(200±90) or 1:(400±200) or 1:(600±200) or 1:(800±200).

A person skilled in the art knows that the cellulosic material may contain further components besides cellulose, such as chemicals used for the chemical and semi-chemical pulping step, dyes, bleaching agents, fillers, etc.

If not expressly stated otherwise, percentages based on the cellulosic material are to be regarded as being based on the overall composition containing the cellulosic material and the starch (solids content).

If not explicitly stated otherwise, for the purpose of the specification, the term "paper-making process" or "method for the manufacture of paper" refers to the manufacturing of paper as well as to the manufacturing of paperboard and cardboard.

For the purpose of the specification, the cellulosic starting material for the manufacturing of paper, paperboard and/or cardboard, which originates from recovered (waste) paper, is referred to as "recycle material", whereas fresh starting material is referred to as "virgin material". It is also possible that a blend of virgin material and recycle material is used as the starting material for the paper making process, which is herein referred to as "blend material". Furthermore, it is also possible that the cellulosic starting material is "broke" or "coated broke" (recess material) which, for the purpose of the specification, shall be encompassed by the term "recycle material".

For the purpose of the specification, the pulp which originates from virgin material, recycle material or blend material is referred to as "virgin pulp", "recycle pulp" and "blend pulp", respectively.

Typically, water is added during the mechanical pulping step to the cellulosic material, i.e. to the virgin, recycle or blend material, to produce the respective cellulosic pulp, i.e. virgin, recycle or blend pulp. The respective pulp is usually a fibrous aqueous dispersion or fibrous aqueous suspension of the cellulosic material.

The mechanical pulping process is typically performed by exposing the cellulosic material to mechanical force, more specifically shearing force.

According to the invention, biocide is present during the pulping step and/or is added thereafter, preferably shortly thereafter. Microorganisms coming from waste paper also play a role in the degradation of starch contained in the waste paper, particularly when the waste paper is stored for days or months and subjected to microorganism activity during this storage time. Treating waste paper with biocide during pulping cannot reverse the effects caused by microorganism activity upon the starch during waste paper storage. However, growth conditions of microorganism improve significantly during pulping—when the paper gets in contact with process water—and the inventors have found that it is advantageous to add the biocide at this stage of the process. Since the degradation caused by the microorganisms usually takes more time than a few minutes, the inventors have found that it may also be sufficient to add the biocide shortly after pulping.

For that purpose, the cellulosic material that contains the starch, i.e. the virgin, recycle or blend material, is brought into contact with biocide. If the biocide is added shortly after the pulping step, it is preferably added to the cellulosic material 1 to 60 minutes after the pulping step has been finished.

In order to treat the cellulosic material containing the starch with biocide according to the invention, it is apparent to a person skilled in the art that at least a part of the total amount (total inflow) of biocide is added to the cellulosic material containing the starch at any time during the pulping step (a), i.e. after the pulping has been commenced, or shortly after the pulping has been completed. The biocide can be added continuously or discontinuously.

For the purpose of the specification, the term "continuously" means that the amount (inflow) of the biocide for the specific dose is added to the cellulosic material containing the starch without interruption.

For the purpose of the specification, the term "discontinuously" means herein that the addition of the biocide to the cellulosic material containing the starch is performed by means of pulses of a predetermined length which are interrupted by periods during which no biocide is added at this feeding point.

A skilled person is aware that paper making processes as such are typically continuous processes. Thus, any "amount" or "dosage" of biocide, dry and/or wet strength polymer and further additive, respectively, that is to be added to the cellulosic material refers to a respective "inflow" of said biocide, dry and/or wet strength polymer and further additive, respectively, in order to achieve a desired predetermined local concentration thereof in the stream of the cellulosic material. Said inflow may be continuous or discontinuous. Accordingly, when the "amount" or "dosage" of biocide, dry and/or wet strength polymer and further additive, respectively, is divided into portions that are added to the cellulosic material at different locations and/or during different process steps, each portion refers to a partial inflow of said biocide, dry and/or wet strength polymer and further additive, respectively, in order to achieve a desired predetermined local concentration thereof, i.e. downstream with respect to its feeding point.

Typically, water is added to the cellulosic material, i.e. to the virgin, recycle or blend material, prior to and/or during the pulping step. At least a part of the total amount (total inflow) of the biocide may be dissolved, dispersed or suspended in said water used to repulp the cellulosic material containing the starch, i.e. to the virgin, recycle or blend material.

In this embodiment, the biocide and the water used for the pulping may already be brought into contact with one another before pulping is initiated.

In a preferred embodiment according to the invention, the biocide is in contact with the water used for the pulping at least 10 min before pulping commences, or at least 30 min, or at least 60 min, or at least 120 min, or at least 150 min, or at least 180 min, or at least 210 min, or at least 240 min, or at least 300 min, or at least 360 min, or at least 420 min, or at least 480 min.

Typically, the pulping step (a) may take several minutes to several hours. In another preferred embodiment, at least one part of the total amount (total inflow) of the biocide is added to the cellulosic material during the pulping period.

For the purpose of the specification, the term "pulping period" is defined as the total time the pulping step is performed.

For example, in case that the pulping step takes a total time of 1 hour (pulping period), the biocide may be added discontinuously or continuously to the pulper at any point of time or during any time interval, e.g., up to 120 minutes after the pulping step has been commenced.

In step (b) of the method according to the invention the cellulosic material containing the starch is treated with one or more biocides, which are at least partially added to the cellulosic material in the thick stock area, where the cellulosic material has a stock consistency of at least 2.0%, preferably thereby preventing microbial degradation of at least a portion of the starch. In a preferred embodiment, step (b) is at least partially simultaneously performed with step (a) of the method according to the invention, i.e. the biocide treatment is performed during pulping. In another preferred embodiment, step (b) is performed after step (a) has been completed. A skilled person recognizes that any full or partial time overlap of steps (a) and (b) is possible and in accordance with the invention.

In a preferred embodiment, the total amount (total inflow) of biocide is added to the cellulosic material during the pulping step (a) discontinuously or continuously; i.e. 100 wt.-% of the total amount (total inflow) of the biocide is added to the cellulosic material, i.e. to the virgin, recycle or blend material, during the pulping step (a).

In another preferred method, further parts of biocide may be added at any time preferably up to 480 min after the pulping step (a) has been commenced at any suitable place in order to avoid degradation of the starch. This embodiment includes the addition of further parts of the biocide either during the pulping step (a) or preferably up to 60 minutes after pulping has been completed. In a preferred embodiment, at least a part of the total amount (total inflow) of the biocide is added to the cellulosic material containing the starch at any preferably time up to 60 minutes after the pulping step (a) has been completed.

In a preferred embodiment, one or more biocides are added to the cellulosic material at at least 2 different feeding points, more preferably at least 3 different feeding points, and still more preferably at least 4 different feeding points on the papermaking plant, where identical or different biocides or biocide combinations can be added at the various feeding points.

According to the method of the invention, step (b) preferably serves the purpose of avoiding degradation of the starch, which is contained in the cellulosic material, by eradicating the microorganisms that are otherwise capable of degrading the starch (amylase control).

In a preferred embodiment, the one or more biocides are discontinuously added to the cellulosic material on a continuously operating papermaking plant. The one or more biocides are preferably added by means of pulsed feed rates, i.e. peaks in the local concentration of the biocide in the cellulosic material reaching the critical local concentration that is necessary in order to eradicate the microorganisms thereby effectively preventing starch from being degraded. In other words, the cellulosic material passing the feeding point(s) of biocide is transiently locally enriched by biocide in predetermined intervals (biocide intervals) that are interrupted by intervals during which no biocide is locally added (passive intervals).

Preferably, a biocide interval lasts typically at least about 2 minutes, but may also last e.g. up to about 120 minutes. Preferably, the biocide is added to the cellulosic material on a continuously operating papermaking plant during 24 h by means of at least 4, 8, 12, 16, 20, 30, 40, 50, 60, 70 or more biocide intervals that are separated from one another by a respective number of passive intervals, wherein during each biocide interval the desired and predetermined local concentration of the biocide in the cellulosic material is reached.

In another preferred embodiment, the one or more biocides are continuously added to the cellulosic material on a continuously operating papermaking plant.

Preferably, biocide is added to the cellulosic material at at least two feeding points, which are located downstream of one another. For example, biocide is added at a first feeding point and at a second feeding point being located downstream with respect to the first feeding point. Depending upon the half-life and distribution of the biocide in the cellulosic material, the cellulosic material passing the second feeding point may already locally contain biocide that has been added thereto upstream at the first feeding point. Thus, the amount of biocide locally added at the second feeding point can be lower than the amount locally added at the first feeding point in order to reach the same desired and predetermined local concentration of the biocide in the cellulosic material that is necessary in order to eradicate the microorganisms thereby effectively preventing starch from being degraded.

Preferably, biocide, more preferably an oxidizing two-component biocide, is added in section (I) and/or (II); and optionally also in section (III) and/or (IV) of the papermaking plant; more preferably in section (I) and/or (II); as well as in section (IV) of a papermaking plant comprising a papermaking machine, wherein section (I) includes measures taking place before pulping; section (II) includes measures associated with pulping; section (II) includes measures taking place after pulping but still outside the papermaking machine; and section (IV) includes measures taking place inside the papermaking machine.

At least one part of the biocide is preferably added during the pulping step (a) or shortly thereafter. Provided that the biocide which was initially added during pulping step (a) is not completely removed or consumed in the subsequent steps, the biocide is also present in the process steps (c), (d), (e), (f) and (g), if any, which follow the pulping step (a).

In a preferred embodiment, at least one part of the remainder of the total amount (total inflow) of the biocide is added to the cellulosic material during any of steps (c), (d), (e), (f) and/or (g). For example, 50 wt.-% of the total amount (total inflow) of the biocide may be added continuously or discontinuously, prior to and/or during the pulping step (a) and the remaining 50 wt.-% of the total amount (total inflow) of the biocide may be added continuously or discontinuously, prior to, during and/or after the process steps (c), (d), (e), (f) and/or (g).

Provided that the biocide which was added during step (b) and optionally in the process steps (c), (d), (e), (f), and (g), if any, which follow the pulping step (a), is not completely removed in the subsequent steps, said biocide is also present in the papermaking machine.

A great variety of microorganisms can be found in the pulping process. Each type of pulp has its own microbial characteristics. In general, the microorganisms observed in paper manufacture are species of bacteria, yeast and fungi; algae and protozoa exist but rarely cause problems. Problems caused by microorganisms can be very different. Very well known problems are slime formation and corrosion.

Species of the following bacteria genera belong to the usual contaminates of pulp: *Achromobacter, Actinomycetes, Aerobacter, Alcaligenes, Bacillus, Beggiatoa, Crenothrix, Desulphovibrio, Flavobacterium, Gallionella, Leptothrix, Pseudomonas, Sphearotilus,* and *Thiobacillus*. Species of *Alcaligenes, Bacillus* and *Flavobacterium* as well as species of the yeast, *Monilia,* cause pink slime. Red or brown slime is caused by the bacteria that form ferric hydroxide, namely species of *Crenothrix, Gallionella* and *Leptothrix*. Species of *Thiobacillus* and *Beggiatoa* are corrosion bacteria in that they oxidize sulphides to sulphuric acid. Species of *Desulphovibrio* are also corrosion bacteria for the opposite reason. Species of the latter genus reduce sulphate to hydrogen sulphide which interacts with metal to cause corrosion. Metallic sulphides are also black, which is another unwanted effect of sulphate-reducing bacteria.

Among the fungi, species of the following genera are found most frequently in pulp systems: *Aspergillus, Basidiomyces, Cephalosporium, Cladosporium, Endomyces, Endomyopsis, Mucor, Penicillium,* and *Trichoderma*. Blue stain on wood is caused by *Cephalosporium* and *Cladosporium*.

Finally, species of the following genera of yeast may be isolated from pulp: *Monilia, Pullularia, Rhodotorula* and *Saccharomyces*. For further details it is referred to H. W. Rossmoore, Handbook of Biocide and Preservative Use, Chapter Paper and Pulp, Chapman & Hall, 1995.

Most predominant species expriming amylase and thus causing starch degradation include *Actinomycetes, Aerobacter, Bacillus, Beggiatoa, Desulphovibrio, Flavobacterium, Gallionella, Leptothrix, Pseudomonas, Thiobacillus; Aspergillus, Basidiomycetes, Cephalosporium, Endomyces, Endomycopsis, Mucor, Penicillium; Pullularia,* and *Saccharomyces*.

Thus, the purpose of adding biocide according to the invention essentially serves the purpose of eradication one or more of the aforementioned microorganisms and the dosages of biocide are preferably adapted accordingly.

The biocide may be gaseous, solid or liquid; organic or inorganic; oxidizing or non-oxidizing.

The biocide may be employed in substance or in dilution with a suitable solvent, preferably water, in solution or dispersion, suspension or emulsion.

The biocide may be a one-component biocide, a two-component biocide or a multi-component biocide.

The biocide preferably has a comparatively short half-life, i.e. is decomposed comparatively quickly thereby losing its biocidial action. When a combination of two or more biocides is employed, the half-life of at least one biocide within said combination is preferably comparatively short. Preferably, under the conditions of the method according to the invention (temperature, pH and the like), the half-life of the biocide is not more than 24 h, or not more than 18 h, or not more than 12 h, more preferably not more than 10 h, still more preferably not more than 8 h, yet more preferably not more than 6 h, most preferably not more than 4 h and in particular not more than 2 h. The half-life of a given biocide can be easily determined by routine experimentation, preferably under the general conditions of the method according to the invention.

It has been surprisingly found that biocides having a comparatively short half-life are effective in preventing starch degradation by eradicating the microorganisms, which would otherwise decompose the starch, but do not cause problems in the waste water system, which typically also relies on microorganisms that should not be eradicated by the biocide. Further, it has been surprisingly found that biocides having a comparatively short half-life can be employed at comparatively high concentrations without causing substantial problems regarding the waste water treatment.

In the U.S. biocides to be employed in the production of paper and paper board for use in contact with food must be on the approved list of the US Food and Drug Administration (FDA).

In a preferred embodiment, the biocide is selected from oxidizing and non-oxidizing biocides.

Examples of oxidizing biocides include one component systems such as $ClO_2$, $H_2O_2$ or NaOCl; and two component systems comprising e.g. a nitrogenous compound, preferably an inorganic ammonium salts in combination with an oxidant, preferably a halogen source, more preferably a chlorine source, most preferably hypochlorous acid or a salt thereof, such as $NH_4Br$/NaOCl or $(NH_4)_2SO_4$/NaOCl; and two component systems comprising e.g. organic biocides in combination with an oxidant, preferably a halogen source, more preferably a chlorine source, most preferably hypochlorous acid or a salt thereof, such as bromochloro-5,5-dimethylimidazolidine-2,4-dione (BCDMH)/NaOCl, or dimethylhydantoin (DMH)/NaOCl.

In a particularly preferred embodiment, the biocide is an oxidizing two-component biocide where the first component is a nitrogenous compound, preferably selected from ammonia, amines, inorganic or organic salts of ammonia, and inorganic or organic salts of amines; and the second component is a halogen source, preferably a chlorine source. The combinations $NH_4Br$/NaOCl or $(NH_4)_2SO_4$/NaOCl are particularly preferred exidizing biocides.

Preferred nitrogenous compounds include ammonium salts, methylamine, dimethylamine, ethanolamine, ethylenediamine, diethanolamine, triethanolamine, dodecylethanolamine, hexdecylethanolamine, oleic acid ethanolamine, triethylenetetramine, dibutylamine, tributylamine, glutamine, dilaurylamine, distearylamine, tallow-methylamine, cocomethylamine, n-acetylglucosamine, diphenylamine, ethanol/methylamine, diisopropanolamine, n-methylaniline, n-hexyl-n-methylamine, n-heptyl-n-methylamine, n-octyl-n-methylamine, n-nonyl-n-methylamine, n-decyl-n-methylamine, n-dodecyl-n-methylamine, n-tridecyl-n-methylamine, n-tetra-decyl-n-methylamine, n-benzyl-n-methylamine, n-phenylethyl-n-methylamine, n-phenylpropyl-n-methylamine, n-alkyl-n-ethylamines, n-alkyl-n-hydroxyethylamines, n-alkyl-n-propylamines, n-propylheptyl-n-methylamine, n-ethylhexyl-n-methylamine, n-ethylhexyl-n-butylamine, n-phenylethyl-n-methylamine, n-alkyl-n-hydroxypropylamines, n-alkyl-n-isopropylamines, n-alkyl-n-butylamines and n-alkyl-n-isobutylamines, n-alkyl-n-hydroxyalkylamines, hydrazine, urea, guanidines, biguanidines, polyamines, primary amines, secondary amines, cyclic amines, bicyclic amines, oligocyclic amines, aliphatic amines, aromatic amines, primary and secondary nitrogen containing polymers. Examples of ammonium salts include ammonium bromide, ammonium carbonate, ammonium chloride, ammonium fluoride, ammonium hydroxide, ammonium iodide, ammonium nitrate, ammonium phosphate, and ammonium sulfamate. Preferred nitrogenous compounds are ammonium bromide and ammonium chloride.

Preferred oxidants include chlorine, alkali and alkaline earth hypochlorite salts, hypochlorous acid, chlorinated isocyanurates, bromine, alkali and alkaline earth hypobromite salts, hypobromous acid, bromine chloride, halogenated hydantoins, ozone and peroxy compounds such as alkali and alkaline earth perborate salts, alkali and alkaline earth percarbonate salts, alkali and alkaline earth persulfate salts, hydrogen peroxide, percarboxylic acid, and peracetic acid. Particularly preferred halogen sources include reaction products of a base and a halogen, such as hypochlorous acid and the salts thereof. Preferred salts of hypochlorous acid include LiOCl, NaOCl, KOCl, $Ca(OCl)_2$ and $Mg(OCl)_2$, which are preferably provided in aqueous solution. Preferred inorganic salts of ammonia include but are not limited to $NH_4F$, $NH_4Cl$, $NH_4Br$, $NH_4I$, $NH_4HCO_3$, $(NH_4)_2CO_3$, $NH_4NO_3$, $NH_4H_2PO_2$, $NH_4H_2PO_4$, $(NH_4)_2HPO_4$, $NH_4SO_3NH_2$, $NH_4IO_3$, $NH_4SH$, $(NH_4)_2S$, $NH_4HSO_3$, $(NH_4)_2SO_3$, $NH_4HSO_4$, $(NH_4)_2SO_4$, and $(NH_4)_2S_2O_3$. Preferred organic salts of ammonia include but are not limited to $NH_4OCONH_2$, $CH_3CO_2NH_4$ and $HCO_2NH_4$. The amine can be a primary or secondary amine or the amine portion of an amide; for example urea, or alkyl derivatives thereof such as N—N'-dimethyl urea, or N'—N'-dimethylurea. The combination of $NH_4Br$ and NaOCl is particularly preferred and known e.g. from U.S. Pat. No. 7,008,545, EP-A 517 102, EP 785 908, EP 1 293 482 and EP 1 734 009. Preferably, the relative molar ratio of said first component and said second component is within the range of from 100:1 to 1:100, more preferably 50:1 to 1:50, still more preferably 1:20 to 20:1, yet more preferably 1:10 to 10:1, most preferably 1:5 to 5:1 and in particular 1:2 to 2:1.

Compared to strong oxidizers, biocides of this type, i.e. combinations of ammonium salts with hypochlorous acid or salts thereof, have particular advantages.

For a number of years, strong oxidizers have been used to control microbial populations in the papermaking industry. Maintaining an effective level of oxidizer is not always easy or economically viable because paper process streams exhibit a high and variable "demand" on the oxidizer. This demand is caused by the presence of organic materials such as fiber, starch, and other colloidal or particulate organic materials in the process. These organic materials react with and consume the oxidizer, making it much less effective at controlling microbial populations. In order to achieve an effective oxidizer residual in high-demand systems, such as papermaking machines, the oxidizer must be overfed to surpass the demand in the system. Overfeeding strong oxidizers not only leads to higher treatment costs but can also cause many adverse side effects in the papermaking system. These side effects include increased consumption of dyes and other costly wet end additives (for example, optical brighteners and sizing agents), increased corrosion rates, and reduced felt life. Some oxidizers also greatly contribute to the amount of halogenated organic compounds (AOX) produced in the papermaking process. Furthermore, excessive residuals of certain oxidizers may be adequate for controlling microbial populations in the bulk fluid but are ineffective at controlling biofilm due to limited penetration into the biofilm matrix.

In contrast to strong oxidizers, biocides produced by blending ammonium salts, such as an ammonium bromide solution, with e.g. sodium hypochlorite and mill freshwater under specific reaction conditions can be described as a weak oxidizer. The biocide is produced onsite and immediately dosed to the paper system. The dosage required depends on several factors, including freshwater usage, water recycle, and presence of reducing agents. Biocides of this type thus have a comparatively short half-life and therefore do not accumulate which could cause problems concerning the waste water treatment. Further, they are not too aggressive, i.e. do not oxidize the other constituents of the cellulosic material but are comparatively selective for microorganisms.

Oxidizing one or two component biocides of this type can be employed alone, or preferably, particularly when the starting material comprises recycle pulp, in combination with non-oxidizing biocides.

Examples of non-oxidizing biocides include but are not limited to quaternary ammonium compounds, benzyl-$C_{12-16}$-alkyldimethyl chlorides (ADBAC), polyhexamethylenebiguanide (biguanide), 1,2-benzisothiazol-3(2H)-one (BIT), bronopol (BNPD), bis(trichloromethyl)sulfone, diiodomethyl-p-tolylsulfone, sulfone, bronopol/quaternary ammonium compounds, benzyl-$C_{12-16}$-alkyldimethyl chlorides (BNPD/ADBAC), bronopol/didecyldimethylammonium chloride (BNPD/DDAC), bronopol/5-chloro-2-methyl-2H-isothiazol-3-one/2-methyl-2H-isothiazol-3-one (BNPD/so), NABAM/sodium dimethyldithiocarbamate, sodiumdimethyldithiocarbamate-N,N-dithiocarbamate (NABAM), sodiummethyldithiocarbamate, sodium dimethyldithiocarbamate, 5-chloro-2-methyl-4-isothiazolin-3-one (CMIT), 2,2-dibromo-2-cyanoacetamide (DBNPA), DBNPA/bronopol/iso (DBNPA/BNPD/Iso), 4,5-dichloro-2-n-octyl-3-isothiazolin-3-one (DCOIT), didecyldimethylammonium chloride (DDAC), didecyldimethylammoniumchloride, alkyldimethylbenzylammoniumchloride (DDAC/ADBAC), dodecylguanidine monohydro-chloride/quaternary ammonium compounds, benzyl-$C_{12-16}$-alkyldimethyl chlorides (DGH/ADBAC), dodecylguanidine monohydrochloride/methylene dithiocyanate (DGH/MBT), gluteraldehyde (Glut), gluteraldehyde/quaternary ammonium compounds/benzyl-coco alkyl-dimethyl chlorides (Glut/coco), gluteraldehyde/didecyldimethylammonium chloride (Glut/DDAC), gluteraldehyde/5-chloro-2-methyl-2H-isothiazol-3-one/2-methyl-2H-isothiazol-3-one (Glut/Iso), gluteraldehyde/methylene dithiocyanate (Glut/MBT), 5-chloro-2-methyl-2H-isothiazol-3-one/2-methyl-2H-isothiazol-3-one (Iso), methylene dithiocyanate (MBT), 2-methyl-4-isothiazolin-3-one (MIT), methamine oxirane(methamine oxirane), sodium bromide (NaBr), nitromethylidynetrimethanol, 2-n-octyl-3-isothiazolin-3-one (OIT), bis(trichloromethyl) sulphone/quaternary ammonium compounds, benzyl-$C_{12-16}$-alkyldimethyl chlorides (sulphone/ADBAC), symclosene, terbuthylazine, dazomet (thione), tetrakis(hydroxy-methyl)phosphonium sulphate(2:1) (THPS) and p-[(diiodomethyl)sulphonyl]toluene (tolyl sulphone), and mixtures thereof.

A skilled person knows that a single biocide or a single multi-component biocide can be employed or a combination of different biocides.

In a particularly preferred embodiment of the invention, preferably when the starting material comprises recycle pulp, the biocide is a biocide system, preferably comprising a first biocide composed of an inorganic ammonium salt in combination with a halogen source, preferably a chlorine source, more preferably hypochlorous acid or a salt thereof, and a further biocide, preferably selected from the non-oxidizing and/or organic biocides, preferably non-oxidizing organic biocides. For the purpose of the specification, unless expressly stated otherwise, the one or more biocides referred to in step (b) may encompass said further biocide, if present.

In a preferred embodiment, the non-oxidizing biocide comprises bronopol (BNPD) and at least one isothiazolone compound (Iso) selected from the group consisting of 1,2-benzisothiazol-3(2H)-one (BIT), 5-chloro-2-methyl-4-isothiazolin-3-one (CMIT), 4,5-dichloro-2-n-octyl-3-isothiazolin-3-one (DCOIT), methyl-4-isothiazolin-3-one (MIT), 2-n-octyl-3-isothiazolin-3-one (OIT); and/or a sulfone selected from bis(trichloromethyl)sulfone and diiodomethyl-p-tolylsulfone. The combination bronopol/5-chloro-2-methyl-2H-isothiazol-3-one/2-methyl-2H-isothiazol-3-one (BNPD/Iso) is particularly preferred. In another preferred embodiment, the non-oxidizing biocide comprises compounds bearing quaternary ammonium ions in combination with bronopol (BNPD) or in combination with a sulfone selected from bis(trichloromethyl)sulfone and diiodomethyl-p-tolylsulfone. The biocide system, preferably comprising an oxidizing biocide and a non-oxidizing biocide, is particularly preferred when the residence time of the biocide in the thick stock is comparatively long, i.e. the time from the point in time when the biocide is added to the cellulosic material until the point in time when the cellulosic material enters the papermaking machine. In a preferred embodiment, the above biocide system comprising a first and a further biocide is employed when said residence time is at least 1 h, or at least 2 h, or at least 4 h, or at least 6 h, or at least 8 h, or at least 10 h.

Said biocide system is particularly preferred when the starting material comprises recycle pulp. When the starting material essentially consists of virgin pulp, however, the addition of a further biocide is preferably omitted.

When such combination of biocides is employed, at least a portion of the first biocide is preferably added to pulper dilution water, while the further biocide is preferably added to the outlet of the pulper and/or to the inlet of the fiber clarification.

A further one or two component biocide (further biocide) that differs in nature from the biocide of step (b) (first biocide) may be also added to the cellulosic material containing the (non-degraded) starch prior to, during or after the process steps (c) to (g) and/or after the cellulosic material has been supplied to the papermaking machine.

In a preferred embodiment, at least one part of the remainder of the total amount (total inflow) of the biocide (first biocide) and/or another biocide (further biocide) is added to the cellulosic material subsequent to any of steps (c), (d), (e), (f) and/or (g), i.e. at the papermaking machine. For example, 50 wt.-% of the total amount (total inflow) of the first biocide may be added discontinuously or continuously prior to and/or during the pulping step (a) and/or after the process steps (c), (d), (e), (f) and/or (g), and the remaining 50 wt.-% of the total amount (total inflow) of the first biocide may be added discontinuously or continuously, at the papermaking machine.

In a preferred embodiment, further biocide (i.e. another portion of the first biocide and/or a further biocide differing in nature from the first biocide) is added to the cellulosic material containing the (non-degraded) starch at the wet end of the papermaking machine, preferably at the wire section. In a preferred embodiment, said further biocide is added at the machine chest or mixing chest, or at the regulating box, or at the constant part of the papermaking machine. In a preferred embodiment, at least a portion of said further biocide is added to one or more water streams of the papermaking plant selected from the group consisting of pulper dilution water, white water (such as white water 1 and/or white water 2), clarified shower water, clear filtrate, and inlet of clarification. Adding at least a portion of said further biocide to the pulper dilution water is particularly preferred.

The dosage of the one or more biocides depends upon their antimicrobial efficacy. According to the invention, biocide is dosed in an amount sufficient to prevent substantial degradation of the starch contained in the cellulosic material. Suitable dosages for a given biocide can be determined by routine experimentation or by comparing the number of microorganisms before and after addition of the biocide (taking into account that biocides typically need some time in order to eradicate microorganisms).

The addition of biocides during the papermaking process has been known for many years. The presence of microorganisms in the pulp and papermaking process is unavoidable and thus, steps are taken to control their growth and numbers. It would be unrealistic to attempt to kill all the microorganisms. Instead the objective is typically to control, or suppress, the multiplication of microorganisms and thus to curtail their metabolic activities.

In conventional methods for manufacturing paper, paperboard or cardboard the build up of slime is one of the most important indicators that microbial growth and microbial activities must be curtailed. In conventional methods for manufacturing paper, paperboard or cardboard, the biocide is typically added for the conventional purpose of avoiding slime formation, corrosion and/or wet end breaks, controlling wet end deposition or for odor control, but not for the purpose of avoiding microbial degradation of the starch, which is contained in the cellulosic material, by eradicating the microorganisms that are otherwise capable of degrading the starch with the intention to (re-)fixate this starch later on with polymers as described hereinafter.

The above conventional purposes require comparatively low amounts of biocides keeping only relatively small sections of the overall papermaking plant antimicrobially controlled. In contrast, the avoidance of starch degradation according to the invention, i.e. the partial or full eradication of the microorganisms that are capable of degrading the starch (amylase control), typically requires substantially higher amounts/concentrations of biocide. As further shown in the experimental section, the amount of biocide that is preferably employed in accordance with the invention in order to avoid starch degradation is at least 2 times, preferably at least 3 times higher than the amount of biocide conventionally employed in papermaking processes for conventional purposes. Furthermore, the distribution of the biocide that is preferably achieved by dosing the biocide at various feeding points located in various sections of the papermaking plant in the method according to the invention in order to avoid starch degradation at any places is not conventional. For example, according to the product specification of aqueous ammonium bromide compositions currently marketed as microbiological control agent precursor for paper manufacture, the recommended dosage varies merely from 150-600 g/t of dry fiber at an active content of 35%, which corresponds to a maximum dosage of only 210 g ammonium bromide per ton of dry fiber. However, by such a conventional biocide treatment, i.e. by 210 g/t of dry fiber and without addition of further biocide at further locations, the starch that is contained in the remainder of the papermaking plant is still substantially degraded.

In a preferred embodiment of the method according to the invention, step (b) involves the reduction of the content of microorganisms that are contained in the cellulosic material and that a capable of degrading starch by treating the cellulosic material containing the starch with a sufficient amount of a suitable biocide.

In another preferred embodiment of the method according to the invention, step (b) involves the partial or full avoidance, prevention, suppression or reduction of starch degradation by microorganisms that are contained in the cellulosic material and that a capable of degrading starch by treating the cellulosic material containing the starch with a sufficient amount of a suitable biocide.

In another preferred embodiment of the method according to the invention, step (b) involves the partial or full preservation of starch against degradation by microorganisms that are contained in the cellulosic material and that a capable of degrading starch by treating the cellulosic material containing the starch with a sufficient amount of a suitable biocide.

Degradation of the starch contained in the cellulosic material can be monitored by measuring various parameters, e.g. pH value, electrical conductivity, ATP (adenosine triphosphate) content, redox potential, and extinction. Microbiological activity need to be reduced significantly in the entire system, compared to conventional biocide treatments. Thus, the efficacy of a given biocide in a given amount with respect to its effect on the prevention of starch degradation can be investigated by routine experimentation, i.e. by monitoring pH value, electrical conductivity, ATP content, redox-potential, and/or extinction (iodine test) and comparing the situation without biocide treatment to the situation with biocide treatment after a sufficient equilibration period (typically at least 3 days, preferably 1 week or 1 month).

A skilled person is fully aware that papermaking plants comprise a water circuit to which more or less fresh water is added (open system and closed system, respectively). The cellulosic material is brought into contact with the process water at or before pulping step (a), is further diluted by addition of process water when the thick stock is converted into thin stock, and is separated from the process water on the papermaking machine where sheet formation takes place. The process water is returned (recycled) through the water circuit in order to reduce the consumption of fresh water. The parameters of the process water in the water circuit are typically equilibrated, the equilibrium being influenced by system size, added quantity of fresh water, properties of the starting material, nature and amount of additives, and the like.

In a preferred embodiment of the invention, the process water of a continuously operating papermaking plant, on which the method according to the invention is performed, is at least partially recycled. Preferably, at least 5 vol.-% or at least 10 vol.-% or at least 25 vol.-% or at least 50 vol.-% or at least 75 vol.-% or at least 90 vol.-% of the process water are recycled, i.e. the added fresh water preferably amounts to at most 95 vol.-% or at most 90 vol.-% or at most 75 vol.-% or at most 50 vol.-% or at most 25 vol.-% or at most 10 vol.-%.

When changing the process conditions in accordance with the invention, e.g. by addition of higher quantities of biocide at various locations, some parameters spontaneously change locally and reach an equilibrium in the entire system within hours or days, e.g. redox potential, ATP level and oxygen reduction potential (ORP), whereas other parameters typically need more time to equilibrate, e.g. pH value and electrical conductivity.

Typically, the undesired starch degradation leads to a decrease of the pH value of the aqueous cellulosic material. Thus, efficient prevention of starch degradation by eradication of microorganisms due to biocide treatment can be monitored by measuring the pH value of the aqueous phase of the cellulosic material. Preferably, in step (b) of the method according to the invention the one or more biocides are continuously or discontinuously added to the cellulosic material in quantities so that after 1 month of treatment, preferably after two months of treatment on a continuously operating papermaking plant, the pH value of the aqueous phase of the cellulosic material has been increased by at least 0.2 pH units, or by at least 0.4 pH units, or by at least 0.6 pH units, or by at least 0.8 pH units, or by at least 1.0 pH units, or by at least 1.2 pH units, or by at least 1.4 pH units, or by at least 1.6 pH units, or by at least 1.8 pH units, or by at least 2.0 pH units, or by at least 2.2 pH units, or by at least 2.4 pH units, compared to the pH value that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch thereby causing a decrease of the pH value. Preferably, in step (b) of the method according to the invention the one or more biocides are continuously or discontinuously added to the cellulosic material in quantities so that after 1 month of treatment, preferably after two months of treatment on a continuously operating papermaking plant, the pH value of the aqueous phase of the cellulosic material measured at the wet end entry of the papermaking machine has been decreased by not more than 2.4 pH units, or by not more than 2.2 pH units, or by not more than 2.0 pH units, or by not more than 1.8 pH units, or by not more than 1.6 pH units, or by not more than 1.4 pH units, or by not more than 1.2 pH units, or by not more than 1.0 pH units, or by not more than 0.8 pH units, or by not more than 0.6 pH units, or by not more than 0.4 pH units, or by not more than 0.2 pH units, compared to the pH value of a composition containing the starting material (virgin pulp and recycle pulp, respectively) as well as all additives that have been added to the cellulosic material in the corresponding concentrations until it reaches the wet end entry of the papermaking machine.

Typically, the undesired starch degradation also leads to an increase of electrical conductivity of the aqueous cellulosic material. Thus, efficient prevention of starch degradation by eradication of microorganisms due to biocide treatment can be monitored by measuring the electrical conductivity of the aqueous phase of the cellulosic material. Preferably, in step (b) of the method according to the invention the one or more biocides are continuously or discontinuously added to the cellulosic material in quantities so that after 1 month of treatment, preferably after two months of treatment on a continuously operating papermaking plant, the electrical conductivity of the aqueous phase of the cellulosic material has been decreased by at least 5%, or by at least 10%, or by at least 15%, or by at least 20%, or by at least 25%, or by at least 30%, or by at least 35%, or by at least 40%, or by at least 45%, or by at least 50%, or by at least 55%, or by at least 60%, or by at least 65%, or by at least 70%, or by at least 75%, or by at least 80%, compared to the electrical conductivity that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch thereby causing an increase of electrical conductivity. Preferably, in step (b) of the method according to the invention the one or more biocides are continuously or discontinuously added to the cellulosic material in quantities so that after 1 month of treatment, preferably after two months of treatment on a continuously operating papermaking plant, the electrical conductivity of the aqueous phase of the cellulosic material measured at the wet end entry of the papermaking machine has been increased by at most 80%, or by at most 75%, or by at most 70%, or by at most 65%, or by at most 60%, or by at most 55%, or by at most 50%, or by at most 45%, or by at most 40%, or by at most 35%, or by at most 30%, or by at most 25%, or by at most 20%, or by at most 15%, or by at most 10%, or by at most 5%, compared to the electrical conductivity of a composition containing the starting material (virgin pulp and recycle pulp, respectively) as well as all additives that have been added to the cellulosic material in the corresponding concentrations until it reaches the wet end entry of the papermaking machine.

Preferably, the one or more biocides are continuously or discontinuously added to the cellulosic material in quantities so that, preferably after 1 month of treatment, more preferably after two months of treatment on a continuously operating papermaking plant, the electrical conductivity of the aqueous phase of the cellulosic material is at most 7000 µS/cm, or at most 6500 µS/cm, or at most 6000 µS/cm, or at most 5500 µS/cm, or at most 5000 µS/cm, or at most 4500 µS/cm, or at most 4000 µS/cm, or at most 3500 µS/cm, or at most 3000 µS/cm, or at most 2500 µS/cm, or at most 2000 µS/cm, or at most 1500 S/cm, or at most 1000 µS/cm.

Preferably, the method according to the invention includes the continuous or discontinuous measuring of at least one parameter selected from the group consisting of redox potential, ATP level, oxygen reduction potential (ORP), pH value and electrical conductivity of the cellulosic material, preferably electrical conductivity, and the regulating of the biocide dosage in view of the value measured for said at least one parameter in order to improve strength performance and to maintain improved strength performance, respectively.

Preferably, in step (b) of the method according to the invention the one or more biocides are continuously or discontinuously added to the cellulosic material in quantities so that after 1 month of treatment, preferably after two months of treatment on a continuously operating papermaking plant, the dosage of dry and/or wet strength polymer, which is added to the cellulosic material in step (h) in order to achieve a predetermined dry strength and/or wet strength of the paper, can be decreased by at least 5%, or by at least 10%, or by at least 15%, or by at least 20%, or by at least 25%, or by at least 30%, or by at least 35%, or by at least 40%, or by at least 45%, or by at least 50%, or by at least 55%, or by at least 60%, or by at least 65%, or by at least 70%, or by at least 75%, or by at least 80%, compared to the dosage of the same dry and/or wet strength polymer that was added under the otherwise identical conditions immediately before biocide was added for the first time or before the addition of higher amounts of biocide than conventionally employed was started, in order to achieve the same predetermined dry strength and/or wet strength of the paper, i.e. compared to a situation where microorganisms had been degrading the starch thereby causing an increase of electrical conductivity and thus requiring higher dosages of dry and/or wet strength polymer in order to achieve the desired predetermined dry strength and/or wet strength of the paper.

Typically, the undesired starch degradation also leads to a decrease of extinction when subjecting the aqueous cellulosic material to an iodine test. Thus, efficient prevention of starch degradation by eradication of microorganisms due to biocide treatment can be monitored by measuring the extinction of the starch that is contained in the aqueous phase of the cellulosic material by means of the iodine test. Preferably, in step (b) of the method according to the invention the one or more biocides are continuously or discontinuously added to the cellulosic material in quantities so that after 8 hours, preferably after 2 days, more preferably after 3 days of treatment, more preferably after 1 week of treatment on a continuously operating papermaking plant, the extinction of the starch contained in the aqueous phase of the cellulosic material has been increased by at least 5%, or by at least 10%, or by at least 15%, or by at least 20%, or by at least 25%, or by at least 30%, or by at least 35%, or by at least 40%, or by at least 45%, or by at least 50%, or by at least 55%, or by at least 60%, or by at least 65%, or by at least 70%, or by at least 75%, or by at least 80%, compared to the extinction that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch thereby causing a decrease of extinction. In a preferred embodiment, the extinction of native starch is monitored. This can be done at a particular wave length (for details it is referred to the experimental section). According to the invention, the increase of starch content can be higher. For example, depending on the composition of the starting material, the starch content in the very beginning, i.e. when biocide treatment commences, can be about zero.

In a preferred embodiment, the starch that is contained in the cellulosic material, preferably after the pulping step has been completed, has a weight average molecular weight of at least 25,000 g/mol.

In a preferred embodiment, the one or more biocides are dosed in an amount so that after 60 minutes the content of microorganisms (MO) in [cfu/ml] in the cellulosic material containing the starch is at most $1.0\times10^7$, or at most $5.0\times10^6$, or at most $1.0\times10^6$; or at most $7.5\times10^5$, or at most $5.0\times10^5$; or at most $2.5\times10^5$, or at most $1.0\times10^5$, or at most $7.5\times10^4$; or at most $5.0\times10^4$, or at most $2.5\times10^4$, or at most $1.0\times10^4$; or at most $7.5\times10^3$, or at most $5.0\times10^3$, or at most $4.0\times10^3$; or at most $3.0\times10^3$, or at most $2.0\times10^3$, or at most $1.0\times10^3$. In another preferred embodiment, the biocide is dosed in an amount so that after 60 minutes the content of microorganisms (MO) in [cfu/ml] in the cellulosic material containing the starch is at most $9.0\times10^2$, or at most $8.0\times10^2$, or at most $7.0\times10^2$; or at most $6.0\times10^2$, or at most $5.0\times10^2$, or at most $4.0\times10^2$; or at most $3.0\times10^2$, or at most $2.0\times10^2$, or at most $1.0\times10^2$; or at most $9.0\times10^1$, or at most $8.0\times10^1$, or at most $7.0\times10^1$'; or at most $6.0\times10^1$, or at most $5.0\times10^1$, or at most $4.0\times10^1$; or at most $3.0\times10^1$, or at most $2.0\times10^1$, or at most $1.0\times10^1$.

Preferably, the redox potential of the cellulosic material increases by addition of the biocide to a value within the range of from −500 mV to +500 mV, or from −150 mV to +500 mV, or from −450 mV to +450 mV, or from −100 mV to +450 mV, or from −50 mV to +400 mV, or from −25 mV to +350 mV, or from 0 mV to +300 mV. For example, before the biocide is added, the redox potential of the cellulosic material may be −400 mV and after the addition of the biocide it is increased to a value of, e.g., −100 mV to +200 mV.

A positive value of the redox potential indicates an oxidative system, whereas a negative redox potential indicates a reductive system. Suitable methods for measuring the redox potential are known to the skilled person. In this regard it can be referred to e.g. H. Holik, Handbook of Paper and Board, Wiley-VCH, 2006.

Preferably, the ATP (adenosine triphosphate) level of the cellulosic material, expressed in RLU (relative light units), decreases by addition of biocide to a value within the range of from 500 to 400,000 RLU, or from 600 to 350,000 RLU, or from 750 to 300,000 RLU, or from 1,000 to 200,000 RLU, or from 5,000 to 100,000 RLU. For example, before biocide is added, the ATP level may exceed 400.000 RLU and after the addition of biocide it is decreased to a value of, e.g., 5,000 to 100,000 RLU. In a preferred embodiment, the ATP (adenosine triphosphate) level of the cellulosic material, expressed in RLU (relative light units), decreases by addition of biocide to a value within the range of from 5000 to 500,000 RLU, more preferably 5000 to 25,000 RLU.

ATP detection using bioluminescence provides another method to determine the level of microbial contamination. Suitable methods for ATP detection using bioluminescence are known to the skilled person.

In a preferred embodiment, the one or more biocides are dosed to the cellulosic material at a feed rate related to the finally produced paper of at least 5 g/metric ton (=5 ppm), preferably within the range of from 10 g/metric ton to 5000 g/metric ton, more preferably from 20 g/metric ton to 4000 g/metric ton, still more preferably from 50 g/metric ton to 3000 g/metric ton, yet more preferably from 100 g/metric ton to 2500 g/metric ton, most preferably from 200 g/metric ton to 2250 g/metric ton, and in particular from 250 g/metric ton to 2000 g/metric ton, based on the finally produced paper.

In a preferred embodiment, particularly when the biocide is organic and non-oxidizing, e.g. bronopol/5-chloro-2-methyl-2H-isothiazol-3-one/2-methyl-2H-isothiazol-3-one (BNPD/Iso), the biocide is dosed to the cellulosic material at a feed rate related to the finally produced paper of from 25 to 2,500 g/ton paper, more preferably 50 to 2,000 g/ton paper, still more preferably 75 to 1,500 g/ton paper, yet more preferably 100 to 1,250 g/ton paper, even more preferably 125 to 1,000 g/ton paper, most preferably 150 to 900 g/ton paper, and in particular 175 to 850 g/ton paper, based on the finally produced paper.

In a preferred embodiment, the one or more biocides comprise a two component system comprising an inorganic ammonium salt and a halogen source, preferably a chlorine source, more preferably hypochlorous acid or a salt thereof, wherein the molar ratio of the inorganic ammonium salt to the hypochlorous acid or salt thereof is within the range of from 2:1 to 1:2. Under these circumstances, preferably when the starting material of the process according to the invention comprises recycle pulp, said two component system is preferably dosed to the cellulosic material at a feed rate related to the finally produced paper of at least 175 g/metric ton, or at least 200 g/metric ton, or at least 250 g/metric ton, or at least 300 g/metric ton; or at least 350 g/metric ton, or at least 400 g/metric ton, or at least 450 g/metric ton, at least 500 g/metric ton, or at least 550 g/metric ton; more preferably at least 600 g/metric ton, or at least 650 g/metric ton, or at least 700 g/metric ton, or at least 750 g/metric ton, or at least 800 g/metric ton, or at least 850 g/metric ton, or at least 900 g/metric ton, or at least 950 g/metric ton, or at least 1000 g/metric ton; or at least 1100 g/metric ton, or at least 1200 g/metric ton, or at least 1300 g/metric ton, or at least 1400 g/metric ton, or at least 1500 g/metric ton; or at least 1750 g/metric ton, or at least 2000 g/metric ton; in each case based on the weight of the inorganic ammonium salt and relative to the finally produced paper. Under these circumstances, preferably when the starting material of the process according to the invention does not comprise recycle pulp, i.e. essentially consists of virgin pulp, said two component system is preferably dosed to the cellulosic material at a feed rate related to the finally produced paper of or at least 50 g/metric ton, or at least 100 g/metric ton, or at least 150 g/metric ton, or at least 200 g/metric ton, or at least 250 g/metric ton, or at least 300 g/metric ton, or at least 350 g/metric ton, or at least 400 g/metric ton, or at least 450 g/metric ton, or at least 500 g/metric ton, or at least 550 g/metric ton, or at least 600 g/metric ton, or at least 650 g/metric ton; or at least 700 g/metric ton, or at least 750 g/metric ton, or at least 800 g/metric ton, or at least 850 g/metric ton, or at least 900 g/metric ton; or at least 950 g/metric ton, or at least 1000 g/metric ton; in each case based on the weight of the inorganic ammonium salt and relative to the finally produced paper.

In a preferred embodiment, particularly when the biocide is oxidizing, e.g. a two component system comprising an ammonium salt and a halogen source, preferably a chlorine source, more preferably hypochlorous acid or a salt thereof, biocide is dosed to the cellulosic material to a concentration of active substance that is equivalent to elemental chlorine at a concentration within the range of from 0.005 to 0.500% active substance as $Cl_2$ per ton produced paper, more preferably from 0.010 to 0.500% active substance as $Cl_2$ per ton produced paper, still more preferably from 0.020 to 0.500% active substance as $Cl_2$ per ton produced paper, yet more preferably from 0.030 to 0.500% active substance as $Cl_2$ per ton produced paper, most preferably from 0.040 to 0.500%, and in particular from 0.050 to 0.500% active substance as $Cl_2$ per ton produced paper.

In another preferred embodiment, particularly when the biocide is oxidizing, e.g. a two component system comprising an ammonium salt and a halogen source, preferably a chlorine source, more preferably hypochlorous acid or a salt thereof, biocide is dosed to the cellulosic material to a concentration of active substance that is equivalent to elemental chlorine at a concentration within the range of from 0.005 to 0.100% active substance as $Cl_2$ per ton produced paper, more preferably from 0.010 to 0.100% active substance as $Cl_2$ per ton produced paper, still more preferably from 0.020 to 0.100% active substance as $Cl_2$ per ton produced paper, yet more preferably from 0.030 to 0.100% active substance as $Cl_2$ per ton produced paper, most preferably from 0.040 to 0.100% active substance as $Cl_2$ per ton produced paper, and in particular from 0.050 to 0.100% active substance as $Cl_2$ per ton produced paper.

In still another preferred embodiment, particularly when the biocide is oxidizing, e.g. a two component system comprising an ammonium salt and a halogen source, preferably a chlorine source, more preferably hypochlorous acid or a salt thereof, biocide is dosed to the cellulosic material to a concentration of active substance that is equivalent to elemental chlorine at a concentration within the range of from 0.010 to 0.080% active substance as $Cl_2$ per ton produced paper, more preferably from 0.015 to 0.080% active substance as $Cl_2$ per ton produced paper, still more preferably from 0.020 to 0.080% active substance as $Cl_2$ per ton produced paper, yet more preferably from 0.030 to 0.080%, most preferably from 0.040 to 0.080% active substance as $Cl_2$ per ton produced paper, and in particular from 0.050 to 0.080% active substance as $Cl_2$ per ton produced paper.

The above concentrations of the biocide are expressed as equivalent concentrations of elemental chlorine. The determination of the concentration of a biocide (based on active substance) that is equivalent to a particular concentration of elemental chlorine is known to the person of ordinary skill.

Particularly preferred embodiments $A^1$ to $A^6$ concerning the biocide added in step (b) of the method according to the invention (first biocide) and the additional organic biocide (further biocide) are summarized in Table 1 here below:

Most preferred feeding points of the first biocide, which is preferably oxidizing, are located in section (II), (III) and/or (IV) of a papermaking plant. When the feeding point of the first biocide is located in section (I), it is preferably located at the pulper dilution water of a papermaking plant. When the feeding point of the first biocide is located in section (II), it is preferably located at the pulper, preferably at the outlet of the pulper, or at the dilution water after the pulper of a papermaking plant. When the feeding point of the first biocide is located in section (III), it is preferably located at the white water, e.g. at the white water 2, prior to clarification or at the inlet of clarification of a papermaking plant. In preferred embodiments, it is located at the clear filtrate, the shower water, and/or the return water tank of a papermaking plant. When the feeding point of the first biocide is located in section (IV), it is preferably located at the white water, e.g. at the white water 1, preferably prior to the fan pump, the thin stock sorting, and/or the broke pulper of a papermaking plant.

Most preferred feeding points of the further biocide, which is preferably organic non-oxidizing, are located in section (II), (III) and/or (IV) of a papermaking plant. When the feeding point of the further biocide is located in section (I), it is preferably located at the pulper dilution water of a papermaking plant. When the feeding point of the further biocide is located in section (II), it is preferably located at the pulper, preferably at the outlet of the pulper of a papermaking plant. When the feeding point of the further biocide is located in section (III), it is preferably located prior to the thick stock storage, prior to the mixing chest, prior to the machine chest, prior to the thick stock sorting, at the broke thickeners, at the broke pulpers, at the dilution water after the pulper, prior to the clarification or at the inlet of clarification of a papermaking plant. When the feeding point of the further biocide is located in section (IV), it is preferably located at the shower

TABLE 1

| | $A^1$ | $A^2$ | $A^3$ | $A^4$ | $A^5$ | $A^6$ |
|---|---|---|---|---|---|---|
| | | | First biocide | | | |
| nature | oxidizing, two component | oxidizing, two component | oxidizing, two component | oxidizing, two component | oxidizing, two component | oxidizing, two component |
| feeding point | in section (I) and/or (II); and optionally also in section (III) and/or (IV) | in section (I) and/or (II); and optionally also in section (III) and/or (IV) | in section (I) and/or (II); as well as in section (III) and/or (IV) | in section (I) and/or (II); as well as in section (III) and/or (IV) | in section (I) and/or (II); as well as in section (III) and/or (IV) | in section (I) and/or (II); as well as in section (IV); but preferably not in section (III) |
| | | | Further biocide | | | |
| nature | organic, non-oxidizing | organic, non-oxidizing | organic, non-oxidizing | organic, non-oxidizing | organic, non-oxidizing | organic, non-oxidizing |
| feeding point | in section (I) and/or (II); and optionally also in section (III) and/or (IV) | in section (I) and/or (II); as well as in section (III); but preferably not in section (IV) | in section (I) and/or (II); as well as in section (IV); but preferably not in section (III) | in section (I) and/or (II); but preferably neither in section (III) nor (IV) | in section (II); but preferably neither in section (I) nor (III) nor (IV) | in section (II); but preferably neither in section (I) nor (III) nor (IV) | wherein sections (I) to (IV) refer to the sections of a papermaking plant comprising a papermaking machine, wherein section (I) includes measures taking place before pulping; section (II) includes measures associated with pulping; section (III) includes measures taking place after pulping but still outside the papermaking machine; and section (IV) includes measures taking place inside the papermaking machine.

water for the press section or at the shower water for the wire section of a papermaking plant.

In a preferred embodiment, the stock consistency of the cellulosic material in pulping step (a) is within the range of from 3.0 to 6.0%, or from 3.3 to 5.5%, or of from 3.6 to 5.1%, or from 3.9 to 4.8%, or from 4.2 to 4.6%. In another preferred embodiment, the stock consistency of the cellulosic material in pulping step (a) is within the range of from 10 to 25%, or from 12 to 23%, or from 13 to 22%, or from 14 to 21%, or from 15 to 20%. Suitable methods for measuring the stock consistency of cellulosic materials are known to the skilled person. In this regard it can be referred to e.g. M. H. Waller, Measurement and Control of Paper Stock Consistency, Instrumentation Systems &, 1983; H. Holik, Handbook of Paper and Board, Wiley-VCH, 2006.

Pulping step (a) may be performed at ambient conditions.

In a preferred embodiment, pulping step (a) is performed at elevated temperature. Preferably, pulping step (a) is performed at a temperature within the range of from 20° C. to 90° C., more preferably of from 20° C. to 50° C.

In a preferred embodiment, pulping step (a) is performed at a pH value of from 5 to 13, or from 5 to 12, or from 6 to 11, or from 6 to 10, or from 7 to 9. The desired pH value may be adjusted by the addition of acids and bases, respectively.

In a preferred embodiment according to the invention, pulping step (a) is performed in the presence of one or more biocides and further auxiliaries. Said further auxiliaries may comprise, but are not limited to inorganic materials, such as talcum, or other additives.

Typically, the pulped cellulosic material containing the (non-degraded) starch, i.e. virgin, recycle or blend pulp, may be subjected to further process steps all being encompassed by section (III) of the method for the manufacture of paper, paperboard or cardboard, which follow the pulping step (a) of section (II). These steps may comprise, but are not limited to (c) de-inking the cellulosic material; and/or
(d) blending the cellulosic material; and/or
(e) bleaching the cellulosic material; and/or
(f) refining the cellulosic material; and/or
(g) screening and/or cleaning the cellulosic material in the thick stock area; and/or
(h) adding a dry and/or wet strength polymer to the cellulosic material;
(i) screening and/or cleaning the cellulosic material in the thin stock area, i.e. after diluting the thick stock into a thin stock.

In this respect, it should be emphasized that the aforementioned steps (c) to (g) and (i) are optional only, meaning that any one, any two, any three or any four of steps (c) to (g) and (i) may be omitted. It is also possible that the six steps (c) to (g) and (i) are omitted during the paper making process. According to the invention step (b), the treatment of the cellulosic material containing the starch with one or more biocides, is mandatory and may be performed either during the pulping step (a) and/or after the pulping step (a). Provided that step (b), the treatment of the cellulosic material containing the starch with one or more biocides, is at least partially performed after the pulping step (a), it can either be performed before step (c) or at any time during the aforementioned steps (c) to (g). Preferably, however, step (b) is performed before the cellulosic material containing the starch is diluted from a thick stock (being processed at the thick stock area) to a thin stock (being further processed at the thin stock area), i.e. before step (i).

Devices that are suitable for the subsequent steps after pulping step (a) are known to the skilled person. For example, the cellulosic material containing the (non-degraded) starch may be pumped from the pulper into a stock vat, a mixing vat and/or a machine vat before it is supplied to the papermaking machine (i.e. to the so-called "constant part" of the papermaking machine).

The temporal sequence of steps (c) to (g) can be freely chosen, meaning that the temporal sequence of steps (c) to (g) does not necessarily follow the alphabetical order as indicated. Preferably, however, the order is alphabetical.

Further process steps such as storing the cellulosic material in storage tanks or additional washing and/or screening steps may be incorporated after any of the process steps (a) to (g).

In a preferred embodiment, the temporal sequence of the process steps is selected from the group consisting of (a)→(g); (a)→(c)→(g); (a)→(d)→(g); (a)→(e)→(g); (a)→(f)→(g); (a)→(c)→(d)→(g); (a)→(c)→(e)→(g); (a)→(c)→(f)→(g); (a)→(d)→(e)→(g); (a)→(d)→(f)→(g); (a)→(e)→(f)→(g); (a)→(c)→(d)→(e)→(g); (a)→(c)→(d)→(f)→(g); (a)→(c)→(e)→(f)→(g); (a)→(d)→(e)→(f)→(g); and (a)→(c)→(d)→(e)→(f)→(g); wherein, for the purpose of the specification, the symbol "→" means "followed by"; and further process steps such as storing the cellulosic material in storage tanks or additional washing and/or screening steps may be incorporated after any one of the process steps (a) to (g). Step (b), the treatment of the cellulosic material containing the starch with the biocide, can also be incorporated after any one of the process steps (a) to (g).

A person skilled in the art is aware that after each of the process steps (a) to (g), the mixture comprising the cellulosic material and the biocide may be supplied to storage tanks, before it is re-introduced to further process steps of the paper making process.

It is also apparent to a person skilled in the art that at least one part of the remainder of the total amount (total inflow) of the biocide may be added to the cellulosic material, when it is stored in storage tanks after any of process steps (a), (c), (d), (e), (f) and (g).

In general, the pulping step (a) is performed before the cellulosic material containing the (non-degraded) starch enters the papermaking machine. In a preferred embodiment, at least one part of the biocide is added to the water used for pulping prior to or during the pulping step to the cellulosic material, i.e. to the virgin, recycle or blend material. Said addition takes place preferably at least 5 minutes, or at least 10 minutes, or at least 20 minutes, or at least 30 minutes, or at least 40 minutes before the cellulosic material is supplied to the wet end of the papermaking machine, e.g. through the flow box.

In a preferred embodiment, said addition takes place preferably at most 360 minutes, or at most 300 minutes, or at most 240 minutes, or at most 180 minutes, or at most 120 minutes, or at most 60 minutes before the cellulosic material is supplied to the wet end of the papermaking machine, e.g. through the flow box.

Preferably, the time period during which the cellulosic material is in contact with biocide is within the range of from 10 minutes to 3 days.

In a preferred embodiment of the method according to the invention, the time period during which the cellulosic material is in contact with biocide is at least 10 minutes, or at least 30 minutes, or at least 60 minutes, or at least 80 minutes, or at least 120 minutes.

In a preferred embodiment of the method according to the invention, the time period during which the cellulosic material is in contact with biocide is preferably within the range of 12±10 hours, or 24±10 hours, or 48±12 hours, or 72±12.

The duration of pulping step (a) is not critical to the invention. After the pulping step, the pulp according to the invention may be subjected to a de-inking step (c), wherein the virgin pulp, recycle pulp or blend pulp is de-inked, preferably in the presence of the biocide.

After the pulping step, the pulp according to the invention may be subjected to a blending step (d). The blending (d), also referred to as stock preparation, is typically performed in a so-called blend chest, i.e. a reaction vessel wherein additives such as dyes, fillers (e.g., talc or clay) and sizing agents (e.g., rosin, wax, further starch, glue) are added to the pulped cellulosic material, preferably to virgin pulp, recycle pulp or blend pulp, preferably in the presence of the biocide. Fillers are preferably added to improve printing properties, smoothness, brightness, and opacity. Sizing agents typically improve the water resistance and printability of the final paper, paperboard and/or cardboard. The sizing may also be performed on the papermaking machine, by surface application on the sheet.

After the pulping step, the pulp according to the invention may be subjected to a bleaching step (e). Typically, the bleaching (e) is performed to whiten the pulped cellulosic material, preferably in the presence of the biocide. In said bleaching process, chemical bleaches such as hydrogen peroxide, sodium bisulfite or sodium hydrosulfite are typically added to the pulped cellulosic material to remove the color.

After the pulping step, the pulp according to the invention may be subjected to a refining step (f). The refining (f) is preferably performed in a so-called pulp beater or refiner by fibrillating the fibers of the cellulosic material, preferably in the presence of the biocide. The purpose is preferably to brush and raise fibrils from fiber surfaces for better bonding to each other during sheet formation resulting in stronger paper. Pulp beaters (e.g., Hollander beater, Jones-Bertram beater, etc.) process batches of pulp while refiners (e.g., Chaflin refiner, Jordan refiner, single or double disk refiners, etc.) process pulp continuously.

After the pulping step, the pulp according to the invention may be subjected to a screening step (g). The screening (g) is preferably applied to remove undesirable fibrous and non-fibrous material from the cellulosic material, preferably in the presence of the biocide, preferably by the use of rotating screens and centrifugal cleaners.

Before the cellulosic material enters the papermaking machine the cellulosic material which is present as a "thick stock" is diluted with water to "thin the stock". After dilution, the pulp according to the invention may be subjected to a further screening and/or cleaning step (i).

Thereafter, typically close to the end of the paper-making process, the cellulosic material is supplied to a papermaking machine, where it typically enters the wet end of the papermaking machine.

This is where section (IV) of the overall method for the manufacture of paper, paperboard or cardboard begins.

For the purpose of the specification the term "papermaking machine" preferably refers to any device or component thereof that basically serves the formation of sheets from an aqueous suspension of the cellulosic material. For example, the pulper is not to be regarded as a component of the papermaking machine.

Typically, a papermaking machine has a wet end which comprises a wire section and a press section, and a dry end which comprises a first drying section, a size press, a second drying section, a calender, and "jumbo" reels.

The first section of the wet end of the papermaking machine is typically the wire section, where the cellulosic material is supplied through a flow box to the wire section and distributed evenly over the whole width of the papermaking machine and a significant amount of water of the aqueous dispersion or aqueous suspension of the cellulosic material is drained away. The wire section, also called forming section, can comprise one layer or multi layers, wherein multi preferably means 2, 3, 4, 5, 6, 7, 8 or 9 layers (plies). Subsequently, the cellulosic material enters preferably the press section of the papermaking machine where remaining water is squeezed out of the cellulosic material, which forms a web of cellulosic material, which then in turn is preferably supplied to the dry end of the papermaking machine.

The so-called dry end of the papermaking machine comprises preferably a first drying section, optionally a size press, a second drying section, a calender, and "jumbo" reels. The first and the second drying section comprise preferably a number of steam-heated drying cylinders, where synthetic dryer fabrics may carry the web of cellulosic material round the cylinders until the web of cellulosic material has a water content of approximately 4 to 12%. An aqueous solution of starch may be added to the surface of the web of the cellulosic material in order to improve the surface for printing purposes or for strength properties. Preferably, the web of cellulosic material is then supplied to the calender, where it is smoothed and polished. Subsequently, the cellulosic material is typically reeled up in the so-called "jumbo" reel section.

In a preferred embodiment, the method according to the invention is performed on a papermaking plant that can be regarded as having an open water supply and thus an open water circuit. Papermaking plants of this type are typically characterized by a effluent plant, i.e. by an effluent stream by means of which an aqueous composition is continuously drawn from the system.

In another preferred embodiment, the method according to the invention is performed on a papermaking plant that can be regarded as having a closed water recycle circuit. Papermaking plants of this type are typically characterized by not having any effluent plant, i.e. there is no effluent stream by means of which an aqueous composition is continuously drawn from the system, while the paper, of course, contains some residual moisture. All papermaking plants (closed and open systems) typically allow for evaporation of (gaseous) water, whereas closed systems do not allow for liquid effluent streams. It has been surprisingly found that the method according to the invention is of particular advantage in such closed water recycle circuit. Without the method according to the invention, the starch in the liquid phase would concentrate from recycle step to recycle step and finally end up in a highly viscous pasty composition not useful for any paper manufacture. By means of the method according to the invention, however, starch is fixated, preferably re-fixated to the fibers thereby avoiding any concentration effect from recycle step to recycle step.

In a preferred embodiment, at least 50 wt.-%, of the biocide, which is present during step (b), is still present when the cellulosic material containing the (non-degraded) starch enters the wet end of the papermaking machine. In case that the loss of biocide during the paper making process is too high, further parts of the biocide may be added during any of the process steps (c), (d), (e), (f) and/or (g).

In another preferred embodiment, at most 50 wt.-% of the biocide, which is present during step (b), is still present when the cellulosic material containing the (non-degraded) starch enters the papermaking machine.

According to the invention, step (h) comprises adding a dry and/or wet strength polymer to the cellulosic material. Dry and/or wet strength polymers are known to the skilled person. In this regard, it can be referred to e.g., C. J. Biermann, Handbook of Pulping and Papermaking, Academic Press; 2 edition (1996); J. P. Casey, Pulp and Paper, Wiley-Interscience; 3 edition (1983); H Holik, Handbook of paper and board, Wiley-VCH Verlag GmbH & Co. KGaA, 1st ed, 2006; and I. Thorn et al., Applications of Wet-End Paper Chemistry, 2nd edition, Springer, 2009.

For the purpose of the specification, dry and/or wet strength polymers are to be regarded as polymers typically employed in order to improve the dry strength and/or wet strength of the paper, paperboard or cardboard.

The dry and/or wet strength polymer may be added to the cellulosic material containing the starch at any stage of paper manufacture in the thick stock area, or at any stage of paper manufacture in the thin stock area. It is apparent to a person skilled in the art that at least a part of the total amount (total inflow) of the dry and/or wet strength polymer may be added to the cellulosic material, i.e. to the virgin, recycle or blend material, during or after the pulping step (a).

For the purpose of specification, the term "thick stock area" refers to any stage of paper manufacture where the cellulosic material is present as "thick stock". Analogously, the term "thin stock area" refers to any stage of paper manufacture where the cellulosic material is present as thin stock. Typically, thick stock is processed at any steps of conventional processes for the manufacture of paper or paperboard taking place before step (i). The terms "thick stock" and "thin stock" are known to the person skilled in the art. Typically, on the papermaking machine thick stock is diluted before step (i) thereby yielding thin stock. For the purpose of the specification, "thick stock" preferably has a solids content (=stock consistency) of at least 2.0 wt.-%, preferably at least 2.1 wt.-%, more preferably at least 2.2 wt.-%, still more preferably at least 2.3 wt.-%, yet more preferably at least 2.4 wt.-% and most preferably at least 2.5 wt.-%. Thus, for the purpose of the specification, cellulosic material having the above solids content is preferably to be regarded as thick stock, whereas cellulosic material having a lower solids content is to be regarded as thin stock.

In a preferred embodiment, the dry and/or wet strength polymer is added to the cellulosic material containing the (non-degraded) starch during any of steps, (a), (c), (d), (e), (f) or (g), i.e. before the cellulosic material containing the (non-degraded) starch is diluted to a "thin stock" and before the cellulosic material containing the (non-degraded) starch enters the papermaking machine.

In a preferred embodiment, the dry and/or wet strength polymer is added to the cellulosic material containing the starch after the biocide has been added. It is also possible, that the biocide and the dry and/or wet strength polymer are added simultaneously to the cellulosic material containing the starch. Further, it is possible that a first part of the dry and/or wet strength polymer is added to the cellulosic material containing the starch before a first part of biocide is added and subsequently a second part of dry and/or wet strength polymer is added, or vice versa.

In a preferred embodiment, the dry and/or wet strength polymer is added to the cellulosic material containing the starch after the pulping step has been completed.

It is apparent to a person skilled in the art that the amount (inflow) of dry and/or wet strength polymer may be added continuously (uninterruptedly) or discontinuously (interruptedly) with respect to one feeding point. Furthermore, the total amount (total inflow) of dry and/or wet strength polymer can be divided in at least two parts, from which at least one part is continuously or discontinuously added to the cellulosic material containing the starch during or after the pulping step (a) and the other part is continuously or discontinuously added elsewhere, i.e. at one or more feeding points.

In a preferred embodiment, the total amount (total inflow) of dry and/or wet strength polymer is added to the cellulosic material after the pulping step (a) continuously or discontinuously, i.e. 100 wt.-% of the total amount (total inflow) of the dry and/or wet strength polymer is preferably added to the cellulosic material, i.e. to the virgin, recycle or blend material after the pulping step (a).

In a preferred embodiment, at least one part of the total amount (total inflow) of the dry and/or wet strength polymer is added to the cellulosic material subsequent to any of steps (c), (d), (e), (f) and/or (g). For example, 50 wt.-% of the total amount (total inflow) of the dry and/or wet strength polymer may be added continuously or discontinuously, during any of steps (a), (c), (d), (e), (f) and/or (g) and the remaining 50 wt.-% of the total amount (total inflow) of the dry and/or wet strength polymer may be added continuously or discontinuously, at any other processing step, e.g. within the thick stock area or the thin stock area.

The optimum point to add a dry and/or wet strength polymer can differ from one papermaking plant to another.

In a preferred embodiment, the dry and/or wet strength polymer is added to the thick stock, before the last refining has been carried out. In another preferred embodiment, the dry and/or wet strength polymer is added to the thick stock, after the last refining has been carried out. Good mixing can be essential in order to obtain the best performance. Therefore, addition to a well-stirred chest or the down leg of the thick stock level box is preferred.

In a preferred embodiment, a dilute dry and/or wet strength polymer is added to a pipeline, where optimum mixing is achieved by means of a multipoint injection system.

Particularly preferred embodiments $B^1$ to $B^4$ concerning preferred feeding points of the dry and/or wet strength polymer according to the invention are summarized in Table 2 here below:

TABLE 2

| Dry and/or wet strength polymer | $B^1$ | $B^2$ | $B^3$ | $B^4$ | $B^5$ | $B^6$ | $B^7$ |
|---|---|---|---|---|---|---|---|
| feeding point | in section (II), (III), and/or (IV) | (III) and/or IV), but preferably not (II) | (II) and/or (III), but preferably not (IV) | (II) and/or (IV), but preferably not (III) | (II), but preferably neither (III) nor (IV) | (III), but preferably neither (II) nor (IV) | (IV), but preferably neither (II) nor (III) | wherein sections (II) to (IV) refer to the sections of a papermaking plant comprising a papermaking machine, wherein section (II) includes measures associated with pulping; section (III) includes measures taking place after pulping but still outside the papermaking machine; and section (IV) includes measures taking place inside the papermaking machine.

Particularly preferred embodiments of the method according to the invention relate to combinations of any of embodiments $A^1$ to $A^6$ as summarized in Table 1 with any of embodiments $B^1$ to $B^7$ as summarized in Table 2; particularly $A^1+B^1$, $A^1+B^2$, $A^1+B^3$, $A^1+B^4$, $A^1+B^5$, $A^1+B^6$, $A^1+B^7$; $A^2+B^1$, $A^2+B^2$, $A^2+B^3$, $A^2+B^4$, $A^2+B^5$, $A^2+B^6$, $A^2+B^7$; $A^3+B^1$, $A^3+B^2$, $A^3+B^3$, $A^3+B^4$, $A^3+B^5$, $A^3+B^6$, $A^3+B^7$; $A^4+B^1$, $A^4+B^2$, $A^4+B^3$, $A^4+B^4$, $A^4+B^5$, $A^4+B^6$, $A^4+B^7$; $A^5+B^1$, $A^5+B^2$, $A^5+B^3$, $A^5+B^4$, $A^5+B^5$, $A^5+B^6$, $A^5+B^7$; $A^6+B^1$, $A^6+B^2$, $A^6+B^3$, $A^6+B^4$, $A^6+B^5$, $A^6+B^6$, $A^6+B^7$.

The dry and/or wet strength polymer is preferably added to the thick stock, i.e. at the thick stock area of the papermaking plant. In a preferred embodiment, the feeding point of the dry and/or wet strength polymer is located at or after the chest which is located after the pulper, and/or at or before the fan pump of the papermaking plant. Preferably, the feeding point of the dry and/or wet strength polymer is located at or after the mixing chest before the machine chest, and/or before the fan pump of the papermaking plant. Preferably, the feeding point of the dry and/or wet strength polymer is located at the machine chest and/or before the fan pump of the papermaking plant. Preferably, the feeding point of the dry and/or wet strength polymer is located at the outlet of the machine chest and/or before the fan pump of the papermaking plant. Preferably, the feeding point of the dry and/or wet strength polymer is located at the regulating box and/or before the fan pump of the papermaking plant.

The optimum dosage of a dry and/or wet strength polymer varies from application to application, papermaking plant to papermaking plant and grade to grade. Preferred dosages fall in the range of 0.2 to 0.5 wt.-%, based on active content, although dosages as low as 0.05 wt.-% have been successful. This is particularly the case when a cationic promoter is employed. Preferred cationic promoters are so-called "anionic trash collectors", preferably selected from the group consisting of polyamines, polyDADMAC, polyaluminium chloride, aluminium chlorohydrate and alumn.

The exact dosage typically depends on the charge-balance in the wet-end. Measuring the charge helps to achieve the optimum dosage.

In a preferred embodiment, the dry and/or wet strength polymer is dosed to the cellulosic material containing the starch to a concentration of at least 50 g/metric ton, or at least 100 g/metric ton, or at least 250 g/metric ton, or at least 500 g/metric ton, or at least 750 g/metric ton, or at least 1,000 g/metric ton, or at least 1,250 g/metric ton, or at least 1,500 g/metric ton, or at least 2,000 g/metric ton, or at least 3,000 g/metric ton, or at least 4,000 g/metric ton, wherein the metric tons are preferably based on the overall composition containing the cellulosic material, and the grams are preferably based on the dry and/or wet strength polymer as such (active content). More preferably, the dry and/or wet strength polymer is dosed to the cellulosic material to a concentration of from 100 to 5,000 g/metric ton, or from 200 to 4,500 g/metric ton, or from 250 to 4,000 g/metric ton, or from 300 to 3,500 g/metric ton wherein the metric tons are preferably based on the overall composition containing the cellulosic material, and the grams are preferably based on the dry and/or wet strength polymer, respectively, as such (active content).

In a particularly preferred embodiment, the dry and/or wet strength polymer is dosed to the cellulosic material to a concentration of from 500 to 10,000 g/metric ton, or 500 to 9,000 g/metric ton, or 500 to 8,000 g/metric ton, or 500 to 7,000 g/metric ton, or 500 to 6,000 g/metric ton, or 500 to 5,000 g/metric ton, or from 500 to 4,500 g/metric ton, or from 500 to 4,000 g/metric ton, or from 500 to 3,750 g/metric ton, or from 500 to 3,500 g/metric ton, or from 500 to 3,250 g/metric ton, or from 500 to 3,000 g/metric ton, or from 500 to 2,500 g/metric ton, or from 500 to 2,000 g/metric ton, wherein the metric tons are preferably based on the overall composition containing the cellulosic material, and the grams are preferably based on the dry and/or wet strength polymer, respectively, as such (active content, dry basis).

Preferably, the dry and/or wet strength polymer belongs to any one of the following three categories:
(i) polymers capable of only forming hydrogen bonds to starch and/or cellulose fibers, such as certain polyacrylamides,
(ii) polymers capable of additionally forming ionic bonds to starch and/or cellulose fibers, such as highly cationic polyvinylamines,
(iii) polymers capable of covalently bonding to the cellulose fibers, such as glyoxylated polyacrylamide and epichlorohydrin polyamido-polyamines.

The dry and/or wet strength polymer may be non-ionic, cationic, anionic or amphoteric.

For the purpose of the specification, the term "cationic polymer" preferably refers to water-soluble and/or water-swellable polymers, preferably water-soluble polymers, which have a positive net charge. The cationic polymers may be branched or unbranched, cross-linked or not cross-linked, grafted or not grafted.

For the purpose of the specification, the term "anionic polymer" preferably refers to water-soluble and/or water-swellable polymers, preferably water-soluble polymers, which have a negative net charge. The anionic polymers may be branched or unbranched, cross-linked or not cross-linked, grafted or not grafted.

A person skilled in the art knows the meaning of the terms "branched polymer", "unbranched polymer", "cross-linked polymer" and "graft polymer". Definitions for these terms may be found preferably in A. D. Jenkins et al. Glossary of Basic Terms in Polymer Science. *Pure & Applied Chemistry* 1996, 68, 2287-2311.

For the purpose of the specification the term "water-swellable" preferably refers to the increase in volume of polymer particles associated with the uptake of water (cf. D. H. Everett. Manual of Symbols and Terminology for Physicochemical Quantities and Units. Appendix II, Part I: Definitions, Terminology and Symbols in Colloid and Surface Chemistry. *Pure & Applied Chemistry* 1972, 31, 579-638). The swelling behavior of polymers may be measured at different temperatures and pH values in water. The swollen weights of the polymers are determined at intervals, after removal of the surface water, until equilibrium swelling is attained. The percent swelling is preferably calculated by the following equation: % swelling=$100\times[(W_t-W_0)/W_0]$, where $W_0$ is the initial weight and $W_t$ the final weight of the gel at time t (cf. I. M. El-Sherbiny et al. Preparation, characterization, swelling and in vitro drug release behaviour of poly[N-acryloylglycine-chitosan]interpolymeric pH and thermally-responsive hydrogels. *European Polymer Journal* 2005, 41, 2584-2591).

The dry and/or wet strength polymers according to the invention may preferably display a % swelling of at least 2.5%, or at least 5.0%, or at least 7.5%, or at least 10%, or at least 15%, or at least 20% measured in demineralized water at 20° C. and pH 7.4 in phosphate buffer after equilibrium swelling is attained.

For the purpose of the specification, the term "polymer" preferably refers to a material composed of macromolecules containing >10 monomer units (cf. G. P. Moss et al. Glossary of Class Names of Organic Compounds and Reactive Intermediates Based on Structure. *Pure & Applied Chemistry* 1995, 67, 1307-1375).

The dry and/or wet strength polymer may each consist of a single type of dry and/or wet strength polymer or may be contained in a composition comprising different dry and/or wet strength polymers.

The dry and/or wet strength polymers may be homopolymers, which preferably comprise ionic, preferably cationic monomer units as the only monomer component. Further, the dry and/or wet strength polymers may also be copolymers, i.e. bipolymers, terpolymers, quaterpolymers, etc., which comprise, e.g., different ionic, preferably cationic monomer units; or ionic, preferably cationic as well as non-ionic monomer units.

For the purpose of the specification, the term "homopolymer" preferably refers to a polymer derived from one species of monomer and the term "copolymer" preferably refers to a polymer derived from more than one species of monomer. Copolymers that are obtained by copolymerization of two monomer species are termed bipolymers, those obtained from three monomers terpolymers, those obtained from four monomers quaterpolymers, etc. (cf. A. D. Jenkins et al. Glossary of Basic Terms in Polymer Science. *Pure & Applied Chemistry* 1996, 68, 2287-2311).

In case that the dry and/or wet strength polymer is a copolymer, it is preferably a random copolymer, a statistical copolymer, a block copolymer, a periodic copolymer or an alternating copolymer, more preferably a random copolymer. In a particularly preferred embodiment, the dry and/or wet strength polymer is a copolymer with one of the co-monomers being acrylamide or viylamine and vinylamide, respectively. Thus, preferably the dry and/or wet strength polymer according to the invention is preferably based on polyacrylamide or polyvinylamine which in turn may be obtained by fully or partially hydrolyzing polyvinylamide.

Preferably, the dry and/or wet strength polymer independently of one another is derived from ethylenically unsaturated monomers that are preferably radically polymerizable.

Preferably, the dry and/or wet strength polymer is an ionic polymer, more preferably a cationic, anionic or amphoteric polymer. Preferably, the ionicity of the ionic dry and/or wet strength polymer is at most 95 mole.-%, or at most 90 mole.-%, or at most 85 mole.-%, or at most 80 mole.-%, or at most 75 mole.-%, or at most 70 mole.-%, or at most 65 mole.-%, or at most 60 mole.-%, or at most 55 mole.-%, or at most 50 mole.-%, or at most 45 mole.-%, or at most 40 mole.-%, or at most 35 mole.-%, or at most 30 mole.-%, or at most 25 mole.-%, or at most 20 mole.-%, or at most 15 mole.-%, or at most 10 mole.-%, or at most 5 mole.-%, relative to the total amount of monomer units. If the dry and/or wet strength polymer according to the invention is amphoteric, i.e. comprises anionic as well as cationic monomer units, the preferred ionicities preferably refer to the total content of ionic monomer units including anionic and cationic monomer units.

Preferred ionicities, preferably cationicities or anionicities, of the dry and/or wet strength polymer according to the invention are summarized as embodiments $C^1$ to $C^8$ in Table 3 here below:

TABLE 3

| [mole.-%] | $C^1$ | $C^2$ | $C^3$ | $C^4$ | $C^5$ | $C^6$ | $C^7$ | $C^8$ |
|---|---|---|---|---|---|---|---|---|
| preferably | 5.0 ± 4.5 | 10 ± 8 | 20 ± 18 | 30 ± 28 | 40 ± 38 | 50 ± 48 | 60 ± 58 | 80 ± 78 |
| more preferably | 5.0 ± 4.0 | 10 ± 7 | 20 ± 16 | 30 ± 25 | 40 ± 34 | 50 ± 43 | 60 ± 52 | 80 ± 70 |
| still more preferably | 5.0 ± 3.5 | 10 ± 6 | 20 ± 14 | 30 ± 22 | 40 ± 30 | 50 ± 38 | 60 ± 46 | 80 ± 62 |
| yet more preferably | 5.0 ± 3.0 | 10 ± 5 | 20 ± 12 | 30 ± 19 | 40 ± 26 | 50 ± 33 | 60 ± 40 | 80 ± 54 |
| even more preferably | 5.0 ± 2.5 | 10 ± 4 | 20 ± 10 | 30 ± 16 | 40 ± 22 | 50 ± 28 | 60 ± 34 | 80 ± 46 |
| most preferably | 5.0 ± 2.0 | 10 ± 3 | 20 ± 8 | 30 ± 13 | 40 ± 18 | 50 ± 23 | 60 ± 28 | 80 ± 38 |
| in particular | 5.0 ± 1.5 | 10 ± 2 | 20 ± 6 | 30 ± 10 | 40 ± 14 | 50 ± 18 | 60 ± 22 | 80 ± 30 |

A person skilled in the art knows the meaning of the terms "random copolymer", "statistical copolymer", "periodic copolymer", "block copolymer" and "alternating copolymer". Definitions for these terms may be found preferably in A. D. Jenkins et al. Glossary of Basic Terms in Polymer Science. *Pure & Applied Chemistry* 1996, 68, 2287-2311.

For the purpose of the specification, the term "ionicity" shall refer to the net charge of a polymer as well as to its quantitative, preferably molar content of ionic monomer units based on the total content of monomer units, preferably expressed in mole.-%.

Preferably, the dry and/or wet strength polymer comprises monomer units that are derived from radically polymerizable, ethylenically unsaturated monomers. Therefore, in a preferred embodiment the polymer backbone of the dry and/or wet strength polymer is a carbon chain that is not interrupted by heteroatoms, such as nitrogen or oxygen.

Preferably, the dry and/or wet strength polymer has a weight average molecular weight of at most 1,500,000 g/mol, or at most 1,400,000 g/mol, or at most 1,300,000 g/mol, or at most 1,200,000 g/mol, or at most 1,100,000 g/mol, or at most 1,000,000 g/mol, or at most 900,000 g/mol, or at most 800,000 g/mol, or at most 700,000 g/mol, or at most 600,000 g/mol, or at most 500,000 g/mol, or at most 400,000 g/mol, or at most 300,000 g/mol.

Preferred weight average molecular weights of the dry and/or wet strength polymer according to the invention are summarized as embodiments $D^1$ to $D^6$ in Table 4 here below:

TABLE 4

| [×10³ g/mol] | $D^1$ | $D^2$ | $D^3$ | $D^4$ | $D^5$ | $D^6$ |
|---|---|---|---|---|---|---|
| preferably | 75 ± 70 | 150 ± 130 | 250 ± 200 | 500 ± 450 | 750 ± 700 | 1000 ± 900 |
| more preferably | 75 ± 65 | 150 ± 120 | 250 ± 180 | 500 ± 400 | 750 ± 600 | 1000 ± 800 |
| still more preferably | 75 ± 60 | 150 ± 110 | 250 ± 160 | 500 ± 350 | 750 ± 500 | 1000 ± 700 |
| yet more preferably | 75 ± 55 | 150 ± 100 | 250 ± 140 | 500 ± 300 | 750 ± 400 | 1000 ± 600 |
| even more preferably | 75 ± 50 | 150 ± 90 | 250 ± 120 | 500 ± 250 | 750 ± 300 | 1000 ± 500 |
| most preferably | 75 ± 45 | 150 ± 80 | 250 ± 100 | 500 ± 200 | 750 ± 200 | 1000 ± 400 |
| in particular | 75 ± 40 | 150 ± 70 | 250 ± 80 | 500 ± 150 | 750 ± 100 | 1000 ± 300 |

Particularly preferred embodiments of the method according to the invention relate to combinations of any of embodiments $C^1$ to $C^8$ as summarized in Table 3 with any of embodiments $D^1$ to $D^6$ as summarized in Table 4; particularly $C^1+D^1$, $C^2+D^1$, $C^3+D^1$, $C^4+D^1$, $C^5+D^1$, $C^6+D^1$, $C^7+D^1$, $C^8+D^1$; $C^1+D^2$, $C^2+D^2$, $C^3+D^2$, $C^4+D^2$, $C^5+D^2$, $C^6+D^2$, $C^7+D^2$, $C^8+D^2$; $C^1+D^3$; $C^2+D^3$; $C^3+D^3$; $C^4+D^3$; $C^5+D^3$; $C^6+D^3$, $C^7+D^3$, $C^8+D^3$; $C^1+D^4$, $C^2+D^4$, $C^3+D^4$, $C^4+D^4$, $C^5+D^4$, $C^6+D^4$, $C^7+D^4$, $C^8+D^4$; $C^1+D^5$, $C^2+D^5$, $C^3+D^5$, $C^4+D^5$, $C^5+D^5$, $C^6+D^5$, $C^7+D^5$, $C^8+D^5$; $C^1+D^6$, $C^2+D^6$, $C^3+D^6$, $C^4+D^6$, $C^5+D^6$, $C^6+D^6$, $C^7+D^6$, and $C^8+D^6$.

Dry and/or wet strength polymers have been available in the paper industry for many years. Preferred examples of dry and/or wet strength polymers according to the invention include but are not limited to natural polymers or semi-synthetic polymers such as starch, either in its native or chemically modified form, and synthetic polymers.

Preferred synthetic polymers for improving the dry strength and/or wet strength of paper include copolymers of acrylamide. Anionic and cationic versions of this chemistry are much in use today, normally combined with a cationic promoter, to aid adsorption on the paper fibers. Polyacrylamide technology may be enhanced by adding aldehyde reactivity. Glyoxylated polyacrylamides may improve strength through the use of latent reactive aldehyde groups, which undergo inter-polymer cross-linking during the drying of the paper sheet at 80-100° C.

Preferred synthetic polymers for improving the dry strength and/or wet strength of paper also include polyamido polyamine polymers, further reacted with epichlorohydrin, which have been used successfully in the paper industry for many years also as wet strength resins. These additives are very reactive, especially at pH values greater than about 5, particularly greater than about 6, and temperatures of 30 to 60° C. Cross-linking between polymer chains takes place within the treated paper sheet, decreasing the solubility of the resin and preventing water from disrupting the inter-fiber hydrogen bonding. For the purpose of the specification, these polymers encompass and are also referred to as polyamide polyamine epichlorohydrin polymers, polyamido amine epichlorohydrin polymers and polyamino amine epichlorohydrin polymers.

The invention can be used in a combination with other polymer components in order to further improve the strength properties of the paper product. The polymer components can be cationic, or anionic, or amphoteric, or nonionic synthetic, or a natural polymers, or combinations thereof. Examples include but are not limited to cationic starches or amphoteric starches; anionic polymers, such as a polyacrylic acid, copolymers of acrylamide and acrylic acid, and carboxymethyl cellulose; cationic polymers, such as a cross-linked polyamidoamines, polydiallyldimethylammonium chlorides, linear or branched polyamines, polyethyleneimines, fully or partially hydrolyzed polyvinylamines, copolymers of diallyldimethylammonium chloride and acrylamide, copolymers of 2-acryloylethyltrimethyl-ammonium chloride and acrylamide, cationic guar and other natural gum; polymeric aldehyde-functional compounds, such as glyoxalated polyacrylamides, aldehyde celluloses and aldehyde functional polysaccharides; amphoteric polymers such as terpolymers of acrylamide, acrylic acid, and diallyldimethylammonium chloride, or acrylamide, acrylic acid, and 2-acryloylethyltrimethylammonium chloride; substantially nonionic water-soluble polymers such as nonionic polyethyleneoxide or polyacrylamide; and water-insoluble latexes such as polyvinylacetate or styrene-butadiene copolymers.

For the purpose of the specification, "substantially nonionic polymer" are polymers having an ionicity of at most 2 mole.-%, more preferably at most 1 mole.-%, i.e. at most 1 mole.-% and at most 2 mole.-%, respectively, of all monomer units bear ionic groups.

In a preferred embodiment of the method according to the invention, the dry and/or wet strength polymer is selected from the group consisting of (i) non-ionic, anionic, cationic or amphoteric cellulose reactive polymers capable of forming covalent inter-polymer cross-linkages with cellulose, preferably through aldehyde functional groups and/or 3-hydroxy-azetidinium functional groups of the dry and/or wet strength polymer; and (ii) natural or synthetic non-ionic, anionic, cationic or amphoteric polymers.

A skilled person recognizes that combinations of polymers of the above categories (i) and (ii) can also be advantageously used in the method according to the invention.

Preferably, the (i) non-ionic, anionic, cationic or amphoteric cellulose reactive polymers are reaction products of ionic or nonionic, linear or branched, cross-linked or non-cross-linked homo- or copolymers comprising monomer units derived from vinylamides, which are optionally fully or partially hydrolyzed; and/or from other monomers that form polyamines and/or polyamides such as polyalkylenepolyamine and dibasic acids; and/or from (meth)acrylamides; or of polysaccharides with epihalohydrin, preferably epichlorohydrin, or with cellulose reactive agents comprising at least one aldehyde functional group, preferably glyoxal.

When the dry and/or wet strength polymer is the reaction product of epihalohydrin with a polymer, the latter is preferably a polyamine or a polyaminoamide.

When the dry and/or wet strength polymer is the reaction product of a cellulose reactive agent comprising at least one aldehyde functional group with a polymer, the latter is preferably a polyacrylamide or a copolymer of acrylamide with one or more ionic, preferably cationic monomers, preferably selected from polydiallyldimethylammonium chloride and 2-acryloylethyltrimethylammonium chloride.

Preferably, the cellulose reactive agents that are employed in the synthesis of cellulose reactive dry and/or wet strength polymers according to the invention comprise at least one functional group capable of reacting with the polymer and at least one aldehyde functional group that remains unreacted once the cellulose reactive agent has been covalently linked to the polymer through the functional group capable of reacting with the polymer. Said unreacted aldehyde functional groups render the thus obtained polymer cellulose reactive. For the purpose of the specification, these polymers are also referred to as aldehyde functional polymers.

In a preferred embodiment, the functional group capable of reacting with the polymer is also an aldehyde functional group. Thus, preferably, the cellulose reactive agents comprise at least two aldehyde functional groups and are preferably selected from the group consisting of glyoxal, glutaraldehyde, succinaldehyde, furan dialdehyde, 2-hyroxyadipaldehyde, dialdehyde starch, and combinations thereof.

Polymeric aldehyde-functional polymers preferably comprise glyoxylated polyacrylamides, glyoxylated polyvinylamides, aldehyde-rich cellulose, aldehyde-functional polysaccharides, and aldehyde functional cationic, anionic or non-ionic starches. Exemplary materials include those disclosed in U.S. Pat. Nos. 4,035,229; 4,129,722; 4,217,425; 5,085,736; 5,320,711; 5,674,362; 5,723,022; 6,224,714; 6,245,874; 6,274,667; 6,749,721; 7,488,403; 7,589,153; 7,828,934; 7,897,013; US2011/0083821, WO 00/43428; WO 00/50462 A1; WO 01/34903 A1 all of which are herein incorporated by reference.

The polymeric aldehyde-functional polymers can have a molecular weight of about 10,000 g/mol or greater, more specifically about 100,000 g/mol or greater, and more specifically about 500,000 g/mol or greater. Alternatively, the polymeric aldehyde-functional compounds can have a molecular weight below about 200,000 g/mol, such as below about 60,000 g/mol.

Further examples of aldehyde-functional polymers of use in the present invention include dialdehyde guar, aldehyde-functional wet strength additives further comprising carboxylic groups as disclosed in WO 01/83887; dialdehyde inulin; and the dialdehyde-modified anionic and amphoteric polyacrylamides disclosed in WO 00/11046; herein incorporated by reference. Aldehyde-containing surfactants as disclosed in U.S. Pat. No. 6,306,249 can also be used.

When used in the present invention, the aldehyde-functional polymers preferably have at least 5 milliequivalents (meq) of aldehyde per 100 grams of polymer, more specifically at least 10 meq, more specifically still about 20 meq or greater, and most specifically about 25 meq per 100 grams of polymer or greater.

Aldehyde-rich cellulose can include cellulose oxidized with periodate solutions, as disclosed in U.S. Pat. No. 5,703,225, cellulose treated with enzymes, such as the cellulase-treated cellulose disclosed in WO 97/27363 and the aldehyde-modified cellulose products disclosed in EP 1,077,286-A1, all of which are incorporated herein by reference.

In a preferred embodiment, the polymeric aldehyde-functional polymer is a glyoxylated polyacrylamide, such as a cationic glyoxylated polyacrylamide. Such compounds include chloroxylated polyacrylamides described in U.S. Pat. Nos. 3,556,932 and 3,556,933, which are incorporated herein by reference. Another example of a glyoxylated polyacrylamide is a glyoxylated poly(acrylamide-co-diallyl dimethyl ammonium chloride). At times it may be advantageous to utilize a mixture of high and low molecular weight glyoxylated polyacrylamides to obtain a desired effect.

In a particularly preferred embodiment, the cellulose reactive dry and/or wet strength polymer is selected from glyoxylated polyacrylamide (GPAM), glyoxylated polyvinylamines (GPVAm), polyamine-epihalohydrin polymers, and polyamino-polyamide epichlorohydrin polymers (PAE).

Glyoxylated polyacrylamides (GPAM) are typically prepared by treating polyacrylamides, preferably ionic, more preferably cationic copolymers of acrylamide with ionic comonomers such as polydiallyldimethylammonium chloride or 2-acryloylethyltrimethyl-ammonium chloride, with glyoxal. The glyoxal reacts with one of its aldehyde functionalities at the amide functionality of the acrylamide thereby functionalizing the polymer by free aldehyde groups.

Functionalized, preferably glyoxylated polyvinylamines (GPVAm) can be prepared by reacting a starting polyvinylamine with at least a dialdehyde, wherein the starting polyvinylamine is a polymer formed from N-vinylformamide or N-vinylacetamide which polymer is at least partially hydrolyzed to impart a degree of primary amino functionality, prior to the reaction with the dialdehyde. Exemplary dry and/or wet strength polymers of this type include those disclosed in US 2009/0126890, which is herein incorporated by reference.

Preferred glyoxylated polyacrylamides (GPAM) according to the invention are glyoxylated cationic copolymers, preferably copolymers of (meth)acrylamide and cationic comonomers selected from polydiallyldimethylammonium chloride and 2-acryloylethyl-trimethylammonium chloride, and preferably have
a) a weight average molecular weight within the range of 200,000±150,000 g/mol, preferably 200,000±100,000 g/mol; and an ionicity of at most 10 mole.-%, preferably within the range of 3.0±2.9 mole.-%; or
b) a weight average molecular weight within the range of 200,000±150,000 g/mol, preferably 200,000±100,000 g/mol; and an ionicity within the range of 25±20 mole.-%, preferably within the range of 25±10 mole.-%.

In a preferred embodiment, a polymer bearing amino groups is reacted with epihalohydrin, preferably epichlorohydrin thereby yielding another type of polymer that is capable of forming covalent bonds to cellulose. In this regard, it can be distinguished between polyamine epihalohydrin polymers, polyamide epihalohydrin polymers, and polyamine-polyamide epihalohydrin polymers, all of which are preferred dry and/or wet strength polymers according to the invention. Preferred polyamine-epihalohydrin polymers and polyaminopolyamide-epihalohydrin polymers according to the invention include polyaminoamide-epihalohydrin polymers, polyamidepolyamine-epihalohydrin polymers, polyaminepolyamide-epihalohydrin polymers, aminopolyamide-epihalohydrin polymers, and polyamide-epihalohydrin polymers; polyalkylene polyamine-epihalohydrin polymers; polyaminourylene-epihalohydrin polymers; copolyamide-polyurylene-epichlorohydrin polymers; and polyimide-polyarylene-epichlorohydrin polymers. Exemplary dry and/or wet strength polymers of this type include those disclosed in U.S. Pat. Nos. 2,926,154; 3,125,552; 3,311,594; 3,332,901; 3,700,623; 3,772,076; 3,833,531; 3,855,158; 3,887,510; 3,992,251; 4,035,229; 4,129,528; 4,147,586; 4,450,045; 4,501,862; 4,515,657; 4,537,657; 4,722,964; 5,082,527; 5,316,623; 5,318,669; 5,502,091; 5,525,664; 5,614,597; 5,633,300; 5,656,699; 5,674,358; 5,904,808; 5,972,691; 6,179,962; 6,355,137; 6,376,578; 6,429,253; 7,175,740; and 7,291,695, all of which are herein incorporated by reference.

Polyamino-polyamide epichlorohydrin polymers (PAE) are typically prepared by a two-step process that involves 1.) the condensation reaction between a polyalkylenepolyamine (usually diethylenetriamine) and a dibasic acid (usually adipic acid) to form a lower molecular weight polyamide that contains a number of secondary amine functionalities within the polymer backbone; and 2.) the treatment of this lower molecular weight polyamide with epichlorohydrin, principally by reaction at the secondary amine functional groups, to form a cationic, reactive 3-hydroxyazetidinium chloride and to develop further the molecular weight. The formation of undesired by-products such as dichloropropanol and chloropropandiol is typically suppressed and preferably, the content of dichloropropanol is below 1000 ppm, more preferably below 100 ppm and most preferably below 10 ppm.

The dry and/or wet strength polymer, preferably cellulose reactive polymer according to the invention preferably comprises one cellulose reactive polymer, preferably as the only polymer component; or is contained in a composition comprising two different cellulose reactive polymers, preferably as the only polymer components; or three cellulose reactive polymers, preferably as the only polymer components; or four cellulose reactive polymers, preferably as the only polymer components; or even more than four cellulose reactive polymers, preferably as the only polymer components.

Depending on the procedure used for the preparation of the dry and/or wet strength polymer, preferably cellulose reactive polymer, it may comprise further substances such as polyfunctional alcohols, water-soluble salts, chelating agents, free-radical initiators and/or their respective degradation products, reducing agents and/or their respective degradation products, oxidants and/or their respective degradation products, etc.

In a preferred embodiment, the (ii) natural or synthetic non-ionic, anionic, cationic or amphoteric polymers are selected from the group consisting of a) native or chemically modified polysaccharides; preferably selected from native starch, cationic starch, anionic starch, non-ionic starch and carboxymethylcellulose;
b) anionic homo- or copolymers comprising anionic monomer units derived, from (meth)acrylic acid; optionally in combination with non-ionic monomer units derived from (meth)acrylamide;
c) cationic homo- or copolymers comprising cationic monomer units preferably derived from vinylamine, polydiallyldimethylammonium chloride, 2-acryloylethyltrimethylammonium chloride, and/or ethyleneimine; optionally in combination with non-ionic monomer units derived from vinylamide and/or (meth)acrylamide;
d) amphoteric polymers; preferably terpolymers comprising monomer units derived from (meth)acrylamide, (meth) acrylic acid, and diallyldimethylammonium chloride or 2-acryl-oylethyltrimethylammonium chloride;
e) substantially nonionic water-soluble polymers; preferably selected from nonionic polyethyleneoxides and polyacrylamide; and
f) water-insoluble latexes; preferably selected from polyvinylacetate and styrene-butadiene copolymers.

Preferred anionic homo- or copolymers of group b) according to the invention are anionic polyacrylamides, preferably copolymers of (meth)acrylic acid and (meth)acrylamide, and preferably have
(i) a weight average molecular weight within the range of $300,000\pm200,000$ g/mol, preferably $300,000\pm150,000$ g/mol; and an ionicity within the range of $10\pm7.5$ mole.-%, preferably within the range of $10\pm5.0$ mole.-%; or
(ii) a weight average molecular weight within the range of $300,000\pm200,000$ g/mol, preferably $300,000\pm150,000$ g/mol; and an ionicity within the range of $30\pm25$ mole.-%, preferably within the range of $30\pm20$ mole.-%; or
(iii) a weight average molecular weight within the range of $1,300,000\pm250,000$ g/mol, preferably $1,300,000\pm100,000$ g/mol; and an ionicity within the range of $10\pm7.5$ mole.-%, preferably within the range of $10\pm5.0$ mole.-%; or
(iv) a weight average molecular weight within the range of $1,300,000\pm250,000$ g/mol, preferably $1,300,000\pm100,000$ g/mol; and an ionicity within the range of $30\pm25$ mole.-%, preferably within the range of $30+20$ mole.-%.

Preferred cationic homo- or copolymers of group c) according to the invention are cationic polyacrylamides, preferably copolymers of (meth)acrylamide and cationic monomers selected from polydiallyldimethylammonium chloride and 2-acryloylethyltrimethyl-ammonium chloride, and preferably have
(i) a weight average molecular weight within the range of $400,000\pm150,000$ g/mol, preferably $400,000\pm100,000$ g/mol; and an ionicity within the range of $25\pm23$ mole.-%, preferably within the range of $20\pm18$ mole.-%; or
(ii) a weight average molecular weight within the range of $1,200,000\pm350,000$ g/mol, preferably $1,200,000\pm150,000$ g/mol; and an ionicity within the range of $25\pm23$ mole.-%, preferably within the range of $20\pm18$ mole.-%.

In a preferred embodiment, the dry and/or wet strength polymer is a polyvinylamine (PVAm), preferably a polyvinylamine having a weight average molecular weight of at most 1,500,000 g/mol, more preferably at most 1,000,000 g/mol, still more preferably at most 500,000 g/mol. Polyvinylamines are preferably made by the hydrolysis of polyvinylformamide yielding partially or fully hydrolyzed polyvinylformamide. PVAm polymers are very reactive, work over a broad pH range and are quite insensitive to the affects of sulphites, pH, and alkalinity. The mechanisms by which PVAm polymers impart strength to paper are not clear. PVAm polymers are amine-containing polymers that are typically not self-crosslinking polymers and, apparently, lack functionality to covalently bond with hydroxyl or carboxylate groups on pulp fiber. Proposed mechanisms include multiple hydrogen bonding, multiple ionic bonding, low temperature amide formation and aminal formation with cellulose chain ends. According to recent findings, dry strength and/or wet strength seems to result from fibril entanglement of two fibres, which are thus bonded to each other.

Exemplary dry and/or wet strength polymers based on polyvinylamines (PVAm) include those disclosed in U.S. Pat. Nos. 4,818,341, 4,940,514, 4,957,977, 6,616,807, 7,902,312, 7,922,867, US 2009/0145566, US 2010/0108279 all of which are herein incorporated by reference dry and/or wet strength polymers.

Dry strength and/or wet strength is optimally enhanced by adding a combination of PVAm and an anionic copolymer on a polyvinylformamide basis. The strength-enhancing effects of this combination coincide with the strengths attained in a one-sided conventional size press. Combined application of the two chemicals offers the additional benefits of improved dewatering in the wire and press sections, reduced steam consumption levels and higher speeds.

Preferably, these dry and/or wet strength polymers have a low molecular weight (medium structure) and can be preferably branched. The dosage is preferably within the range of from 250 g/ton dry paper to 5,000 g/ton dry paper, more preferably 500 g/ton dry paper to 5,000 g/ton dry paper.

In a particularly preferred embodiment of the method according to the invention, the dry and/or wet strength polymer is selected from the group consisting of
(i) non-ionic, anionic, cationic or amphoteric cellulose reactive polymers capable of forming covalent interpolymer cross-linkages with cellulose, preferably through functional groups of the dry and/or wet strength polymer selected from
aldehyde functional groups, preferably glyoxylated polyacrylamides; and/or
3-hydroxy-azetidinium functional groups, preferably polyamine-epihalohydrin polymers and polyaminopolyamide-epihalohydrin polymers; and
(ii) synthetic non-ionic, anionic, cationic or amphoteric polymers comprising vinylamine units and/or (meth) acrylamide units and having a weight average molecular weight of at most 1,500,000 g/mol, more preferably at most 1,000,000 g/mol, still more preferably at most 500,000 g/mol, preferably non-ionic, anionic, cationic or amphoteric polyvinylamine polymers or non-ionic, anionic, cationic or amphoteric poly(meth)acrylamide polymers.

In a preferred embodiment, two dry and/or wet strength polymers having identical or opposite charges are added to the cellulosic material. Preferably, the dry and/or wet strength polymers have opposite charges and are based on starches, carboxymethyl celluloses, polyacrylamides, polyinylamines or combinations of these components.

Preferably, both polymer components are added after refining and apart from one another. Preferred feeding points are before and after the machine chest feed pump. The further apart the two components, typically the better the results.

Preferably, further compounds are added to the cellulosic material in order to improve the performance of the dry and/or wet strength polymers. Typical examples of such further compounds include promoters.

The dry strength performance and/or wet strength performance of the dry and/or wet strength polymers can depend upon the age and quality of the dry and/or wet strength polymer at the time of its use, the wet-end papermaking conditions and the drying conditions which may influence the reaction of the dry and/or wet strength polymer to the cellulose fibers if the dry and/or wet strength polymer is cellulose reactive.

When the cellulosic material has a high content of anionic impurities (anionic trash) that cannot be easily removed by washing, fixing agents or so-called "anionic trash collectors" (ATC) can be added to the cellulosic material before the dry and/or wet strength polymers are added. Preferred "anionic trash collectors" are selected from the group consisting of polyamines, polyDADMAC, polyaluminium chloride, aluminium chlorohydrate and alumn.

When the dry and/or wet strength polymer is a cellulose reactive polyamino-polyamide epichlorohydrin polymers (PAE), preferred anionic trash collectors are preferably polyamino-polyamide epichlorohydrin polymers that are added to the cellulosic material upstream. The cationic charge of these anionic trash collecting polyamino-polyamide epichlorohydrin polymers is preferably significantly higher than that of the polyamino-polyamide epichlorohydrin polymers (PAE) subsequently added as dry and/or wet strength polymers.

When anionic dry and/or wet strength polymers are used, it is common to have a strong cationic promoter to ensure that the dry and/or wet strength polymer is fixed onto the anionic fibers. In the case of acidic papermaking conditions, this promoter is preferably alum or polyaluminium chloride. Under neutral and alkaline papermaking conditions, a synthetic cationic additive is preferably used, e.g. a separate polyamine, which is preferably added to the cellulosic material upstream, i.e. before the dry and/or wet strength polymer is added to the cellulosic material. Feeding points after refining are preferred.

When cationic dry and/or wet strength polymers are employed, cationic promoters such as polyamines can also have a benefit and thus, are preferably added to the cellulosic material.

Aside from adding highly cationic additives that form complexes with anionic impurities that would otherwise impair the adsorption of the dry and/or wet strength polymers on the cellulosic fibers, anionic polymers are preferably added to further increase the retention of dry and/or wet strength polymers. Carboxymethylcellulose and anionic polyacrylamides are among the preferred additives. The anionic polymers are preferably added to the thick stock after the addition of the dry and/or wet strength polymer. Addition to the thin stock is also possible, but less preferred, as this can lead to the formation of deposits. The ratio between the cationic dry and/or wet strength polymer and anionic polymer can be critical and needs to be adjusted in order to avoid formation of deposits.

The dry and/or wet strength polymer according to the invention may also be used in combination with an additional retention aid. The term "retention aid", as used herein, refers to one or more components which, when being applied to a stock of cellulosic material, improve the retention compared to a stock of cellulosic material in which no retention aids are present.

Suitable retention aids that may be employed in combination with the dry and/or wet strength polymer according to the invention are preferably cationic polymers, including polyvinylamine polymers, or anionic microparticulate materials, including anionic inorganic particles, anionic organic particles, water-soluble anionic vinyl addition polymers, aluminium compounds and combinations thereof. However, it is also possible that the dry and/or wet strength polymer fully or partially replaces retention aids as it may have properties of a retention aid itself.

Anionic inorganic particles that can be used in combination with the dry and/or wet strength polymer according to the invention include anionic silica-based particles and clays of the smectite type.

Anionic silica-based particles, i.e. particles based on $SiO_2$ or silicic acid, include colloidal silica, different types of polysilicic acid, colloidal aluminium-modified silica, aluminium silicates, and mixtures thereof. Anionic silica-based particles are usually supplied in the form of aqueous colloidal dispersions, so-called sols.

Clays of the smectite type that are suitable to be used in combination with the dry and/or wet strength polymer according to the invention include montmorillonite/bentonite, hectorite, beidelite, nontronite and saponite, preferably bentonite.

Anionic organic particles that are preferably used in combination with the dry and/or wet strength polymer according to the invention include highly cross-linked anionic vinyl addition polymers and co-polymers derivable from an anionic monomer such as acrylic acid, methacrylic acid and sulfonated vinyl addition monomers, which may be co-polymerized with non-ionic monomers, such (meth)acrylamide or alkyl(meth)acrylates; and anionic condensation polymers such as melamine-sulfonic acid sols.

Aluminium compounds that are preferably employed with the dry and/or wet strength polymer according to the invention include alum, aluminates such as sodium aluminate, aluminium chloride, aluminium nitrate and polyaluminium compounds. Suitable polyaluminium compounds are for example polyaluminium chlorides, polyaluminium sulphates, polyaluminium compounds containing both chloride and sulphate ions, polyaluminium silicate-sulphates, polyaluminium compounds and mixtures thereof. The polyaluminium compounds may also contain other anions, including anions derived from phosphoric acid, sulphuric acid, citric acid and oxalic acid.

Preferably, the dry and/or wet strength polymer and the additional retention aid are employed in such a ratio that the retention is improved compared to cellulosic material containing either the dry and/or wet strength polymer alone or the additional retention aid alone.

In a preferred embodiment of the invention, the method comprises the additional step of (j) employing an auxiliary additive typically used in paper manufacture.

The invention can be used in a combination with other compositions in order to further improve the strength properties of the paper product. The compositions that may be used in combination with the invention can be a cationic, or an anionic, or an amphoteric, or a nonionic synthetic, or a natural polymer, or combinations thereof. For example, the invention can be used together with a cationic starch or an amphoteric starch.

In a preferred embodiment, the method according to the invention does not encompass the addition of cellulytic enzymes to the cellulosic material, preferably not the introducing of at least one cellulytic enzyme composition and at least one cationic polymer composition to a papermaking pulp at about the same time to form a treated pulp.

Dry and/or wet strength polymers are preferably supplied either as a powder or as a water-based solution, sometimes as an emulsion. Thus, the dry and/or wet strength polymer according to the invention may be solid, e.g. in form of a powder, in the form of a solution, dispersion, emulsion or suspension.

For the purpose of the specification, the term "dispersion" comprises preferably aqueous dispersions, water-in-oil dispersions and oil-in-water dispersions. A person skilled in the art knows the meaning of these terms; in this respect it may be also referred to EP 1 833 913, WO 02/46275 and WO 02/16446.

Preferably, dry and/or wet strength polymer according to the invention is dissolved, dispersed, emulsified or suspended in a suitable solvent. The solvent may be water, an organic solvent, a mixture of water with at least one organic solvent or a mixture of organic solvents.

In another preferred embodiment, the dry and/or wet strength polymer according to the invention is in the form of a solution, wherein the polymer is dissolved in water as the only solvent or in a mixture comprising water and at least one organic solvent.

More preferably, the dry and/or wet strength polymer according to the invention is in the form of a dispersion, an emulsion or a suspension, wherein the dry and/or wet strength polymer is dispersed, emulsified or suspended in a mixture comprising water and at least one organic solvent. Preferably, the dry and/or wet strength polymer is in the form of a dispersion, an emulsion or a suspension, wherein the dry and/or wet strength polymer is dispersed, emulsified or suspended in water as the only solvent, i.e. no organic solvent is present. In another preferred embodiment of the invention, the dry and/or wet strength polymer according to the invention is in the form of a dispersion, wherein the dry and/or wet strength polymer is dispersed in water as the only solvent or in a mixture comprising water and at least one organic solvent. It is especially preferred that the dry and/or wet strength polymer dispersion according to the invention is substantially oil-free.

Suitable organic solvents are preferably low-molecular weight alcohols (e.g., methanol, ethanol, n-propanol, iso-propanol, n-butanol, iso-butanol, sec-butanol, tert-butanol, etc.), low molecular weight ethers (e.g., dimethylether, diethylether, di-n-propylether, di-iso-propylether, etc.), low molecular weight ketones (e.g. acetone, butan-2-one, pentane-2-one, pentane-3-one, etc.), low molecular weight hydrocarbons (e.g., n-pentane, n-hexane, petroleum ether, ligroin, benzene, etc.) or halogenated low molecular weight hydrocarbons (e.g., methylene chloride, chloroform, etc.) or mixtures thereof.

The dry and/or wet strength polymer according to the invention may also be a solid, i.e. in particulate form, such as in the form of granulates, pellets or powders.

The dry and/or wet strength polymer in the form of a solution, dispersion, emulsion, suspension, granulate, pellets, or powder is preferably dispersed, emulsified, suspended, dissolved or diluted in a suitable solvent such as water, an organic solvent, a mixture of water with at least one organic solvent, or a mixture of at least two organic solvents, before being added to the cellulosic material.

In a particularly preferred embodiment of the method according to the invention,
- the one or more biocides comprise an inorganic ammonium salt in combination with a halogen source, preferably a chlorine source, more preferably hypochlorous acid or a salt thereof; preferably $NH_4Br/NaOCl$ (first biocide); which is preferably added prior to or during pulping; and
- an organic, preferably non-oxidizing biocide (further biocide), which is preferably added independently from the first biocide; and
- the dry and/or wet strength polymer is capable of forming covalent bonds to cellulose fibers, preferably selected from glyoxylated poly(meth)acrylamides and polyamino-polyamide epichlorohydrin polymers.

In particularly preferred embodiments of the method according to the invention,
(i) in step (b) the one or more biocides are continuously or discontinuously added to the cellulosic material in quantities so that
- after 1 month of treatment on a continuously operating papermaking plant, the pH value of the aqueous phase of the cellulosic material has been increased by at least 0.2 pH units, compared to the pH value that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch; and/or
- after 1 month of treatment on a continuously operating papermaking plant, the electrical conductivity of the aqueous phase of the cellulosic material has been decreased by at least 5%, preferably at least 20%, more preferably at least 50%, compared to the electrical conductivity that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch; and/or
- after 48 hours, preferably after 8 hours on a continuously operating papermaking plant, the extinction of the starch (corresponding to the concentration of free starch) contained in the aqueous phase of the cellulosic material has been increased by at least 5%, compared to the extinction that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch; and/or
- after 48 hours, preferably after 8 hours on a continuously operating papermaking plant, the concentration of ATP in the aqueous phase of the cellulosic material has been decreased by at least 5%, compared to the concentration of ATP that was measured, preferably at the same location, preferably at the wet end entry of the papermaking machine immediately before biocide was added for the first time or before the addition of higher amounts of biocide than conventionally employed was started, i.e. compared to a situation where microorganisms had been degrading the starch; and/or
- after 48 hours, preferably after 8 hours on a continuously operating papermaking plant, the redox potential of the aqueous phase of the cellulosic material has been increased to an absolute value of at least −75 mV; and/or (ii) the one or more biocides comprise an ammonium salt; preferably $NH_4Br$ in combination with a halogen source, preferably a chlorine source, more preferably hypochlorous acid or a salt thereof; and/or the one or more biocides comprise an ammonium salt, preferably $NH_4Br$ in combination with hypochlorous acid or a salt thereof, as first biocide and an organic, preferably non-oxidizing biocide as further biocide;

(iii) the one or more biocides comprise an oxidizing biocide that is employed at a concentration equivalent to a concentration of at least 0.005% active substance as $Cl_2$ per ton produced paper, more preferably at least 0.010% active substance as $Cl_2$ per ton produced paper; and/or
(iv) the one or more biocides are added to the thick stock, preferably at least a portion thereof is added to the dilution water for the pulper; and/or
(v) the starting material comprises virgin pulp or recycle pulp.

On a continuously operating papermaking plant, at which the paper manufacture may optionally be transiently shut down for maintenance purposes, a preferred embodiment of the invention includes the steps:
(A) measuring a property of the aqueous phase of the cellulosic material selected from the group consisting of electrical conductivity, redox potential, pH value, concentration of ATP and concentration of free starch; at a predetermined location of the papermaking plant, preferably at a location in the thick stock area or in the thin stock area;
(B) manufacturing paper, paperboard or cardboard by the method according to the invention comprising steps (a), (b), ($h_1$) and optionally ($h_2$);
(C) measuring the same property as measured in step (A), preferably at the same location, preferably at the wet end entry of the papermaking machine of the papermaking plant as in step (A), after time $\Delta t$, preferably after at least 1, 2, 3, 4, 5, 10, 14, 21 or 28 days, and comparing the value measured in step (C) with the value measured in step (A); and
(D) regulating, preferably optimizing the dosage of biocide added in step (b) and/or the dosage of dry and/or wet strength polymer added in step (h) in dependence of the result of the comparison made in step (C).

For the purpose of the specification, optimization preferably means that at minimized consumption of biocide the substantial alteration of the measured value ($m_2$ vs. $m_1$) is prevented.

The method according to the invention is suitable for the manufacture of paper, paperboard or cardboard. Preferably, the paper, paperboard or cardboard has an area weight of less than 150 $g/m^2$, of from 150 $g/m^2$ to 600 $g/m^2$, or of more than 600 $g/m^2$. In a preferred embodiment, the area weight is within the range of 15±10 $g/m^2$, or 30±20 $g/m^2$, or 50±30 $g/m^2$, or 70±35 $g/m^2$, or 150±50 $g/m^2$.

Another aspect of the invention relates to the use of the dry and/or wet strength polymer as defined above in the method for manufacturing paper, paperboard or cardboard, to increase the strength of paper, paperboard or cardboard. All preferred embodiments that have been described above in connection with the methods according to the invention also apply to this aspect of the invention and thus, are not repeated hereinafter.

Still another aspect of the invention relates to the use of a biocide or combination of biocides as defined above for reducing the electrical conductivity of the aqueous phase of a cellulosic material in the manufacture of paper, paperboard or cardboard. All preferred embodiments that have been described above in connection with the methods according to the invention also apply to this aspect of the invention and thus, are not repeated hereinafter.

Yet another aspect of the invention relates to the use of the biocide as defined above in the method for manufacturing paper, paperboard or cardboard, to increase the strength of paper, paperboard or cardboard. All preferred embodiments that have been described above in connection with the methods according to the invention also apply to this aspect of the invention and thus, are not repeated hereinafter.

The following examples further illustrate the invention are not to be construed as limiting its scope.

EXAMPLES

Example 1

The following experiments were run on different commercially used paper mills throughout Europe. Examples 1 and 4 were run on a closed system, whereas the other Examples were run on open systems. The starting material was in each case 100% recycled papers. The following biocides were employed at the following dosages and feeding points as summarized in Table 5:

TABLE 5

| Parameters for settings A, B, C and D | Setting A | Setting B | Settingt C | Setting D |
|---|---|---|---|---|
| furnish types [CEPI] | 1.02 | 1.02 | 1.02 | 1.02 |
|  | 1.04 | 1.04 | 1.04 | 1.04 |
|  | 4.01 |  |  | 4.01 |
|  |  |  |  | 1.01 |
| $NH_4Br$ biocide |  |  |  |  |
| dosage [concentration of active substance equivalent to elemental chlorine, expressed in % active substance as $Cl_2$ per ton produced paper] | 0.020 | 0.019 | 0.019 | 0.017 |
| feeding points | pulper dilution water, white water 2, white water 1, clarified shower water | pulper dilution water, white water 1, clear filtrate, inlet clarification | pulper dilution water, white water 1, clear filtrate, inlet clarification | pulper dilution water, white water 2, white water 1, clarified shower water |
| organic biocide |  |  |  |  |
| dosage [g/ton paper] | 830 | 258 | 258 | 200 |
| feeding points | outlet pulper, inlet fiber clarification | outlet pulper, inlet fiber clarification | outlet pulper, inlet fiber clarification | outlet pulper |

CEPI—Confederation of European Paper Industries

For comparative purposes, it should be noted that ammonium bromide biocide is conventionally employed at dosages of 0.005 to 0.008% active substance as $Cl_2$ per ton produced paper, i.e. the dosage employed in the experiments in accordance with the invention is 2 to 10 times higher than the conventional dosage.

The pH values and the electrical conductivity were measured and the results are summarized in Table 6 here below:

TABLE 6

|  | Setting A | Setting B | Setting C | Setting D |
|---|---|---|---|---|
| pH changes (average) |  |  |  |  |
| conventional biocide | 6.21[1] | 6.87[2] | 6.97[2] | 6.93[2] |
| inventive biocide | 7.30[3] | 7.54[3] | 7.54[3] | 7.57[3] |
| electrical conductivity changes (average, [µS/cm]) |  |  |  |  |
| conventional biocide | 15,190[1] | 3,520[2] | 3,520[2] | 2,500[2] |
| inventive biocide | 7,860[3] | 1,775[3] | 1,775[3] | 1,370[3] |

[1] organic biocide in conventional amounts, absence of $NH_4Br$ biocide
[2] $NH_4Br$ biocide in conventional amounts, absence of organic biocide
[3] combination of $NH_4Br$ biocide with organic biocide in increased amounts as set forth in Table 3

As can be seen from the experimental results of Table 6, when adding biocide at a sufficient dose and at suitable feeding points distributed over the papermaking plant, a substantial decrease of electrical conductivity and increase of pH can be achieved.

Figure 1C:
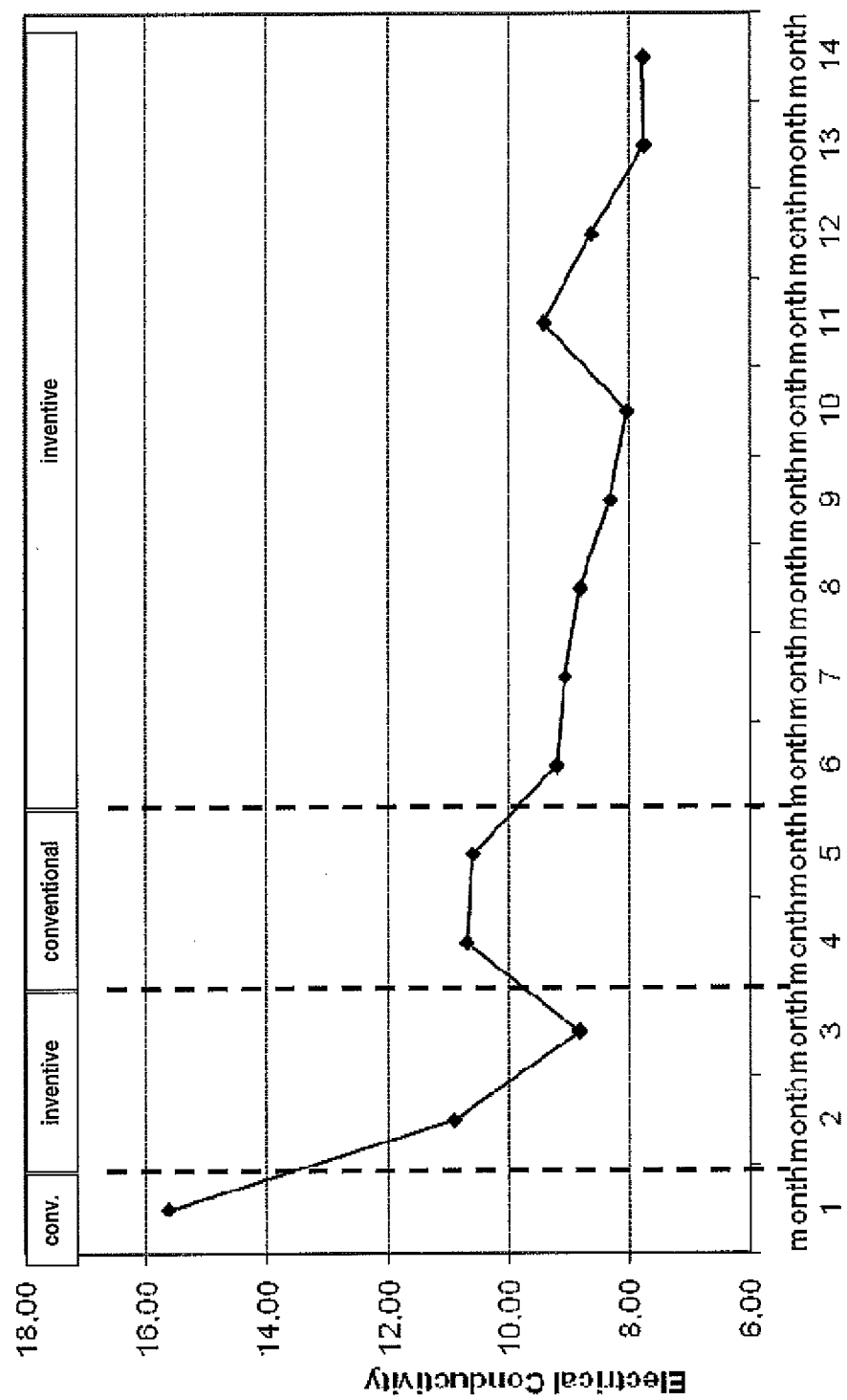

FIG. 1 shows the dependency of redox potential (FIG. 1A), pH value (FIG. 1B) and electrical conductivity (FIG. 1C) on the dosage of biocide in one experiment that was conducted on a paper mill (setting A). During month 1, conventional organic biocide was dosed in conventional amounts. During months 2 and 3, biocide was added in accordance with the invention. During months 4 and 5, conventional organic biocide was again dosed in conventional amounts. From month 6 onwards, biocide was again added in accordance with the invention. As can be seen from FIGS. 1A, 1B and 1C, when adding biocide at a sufficient dose and at suitable feeding points distributed over the papermaking plant, a substantial increase of redox potential and pH value as well as a substantial decrease of electrical conductivity can be achieved.

Example 2

Another experiment was conducted at a paper mill that had been employing conventional, low amounts of biocide ($NH_4Br$/NaOCl, <400 g/t). When increasing the feed rate of this biocide and adding organic, non-oxidizing biocide as a further biocide, it could be shown in one day only that the conductivity of the system can be substantially decreased.

Figure 2:
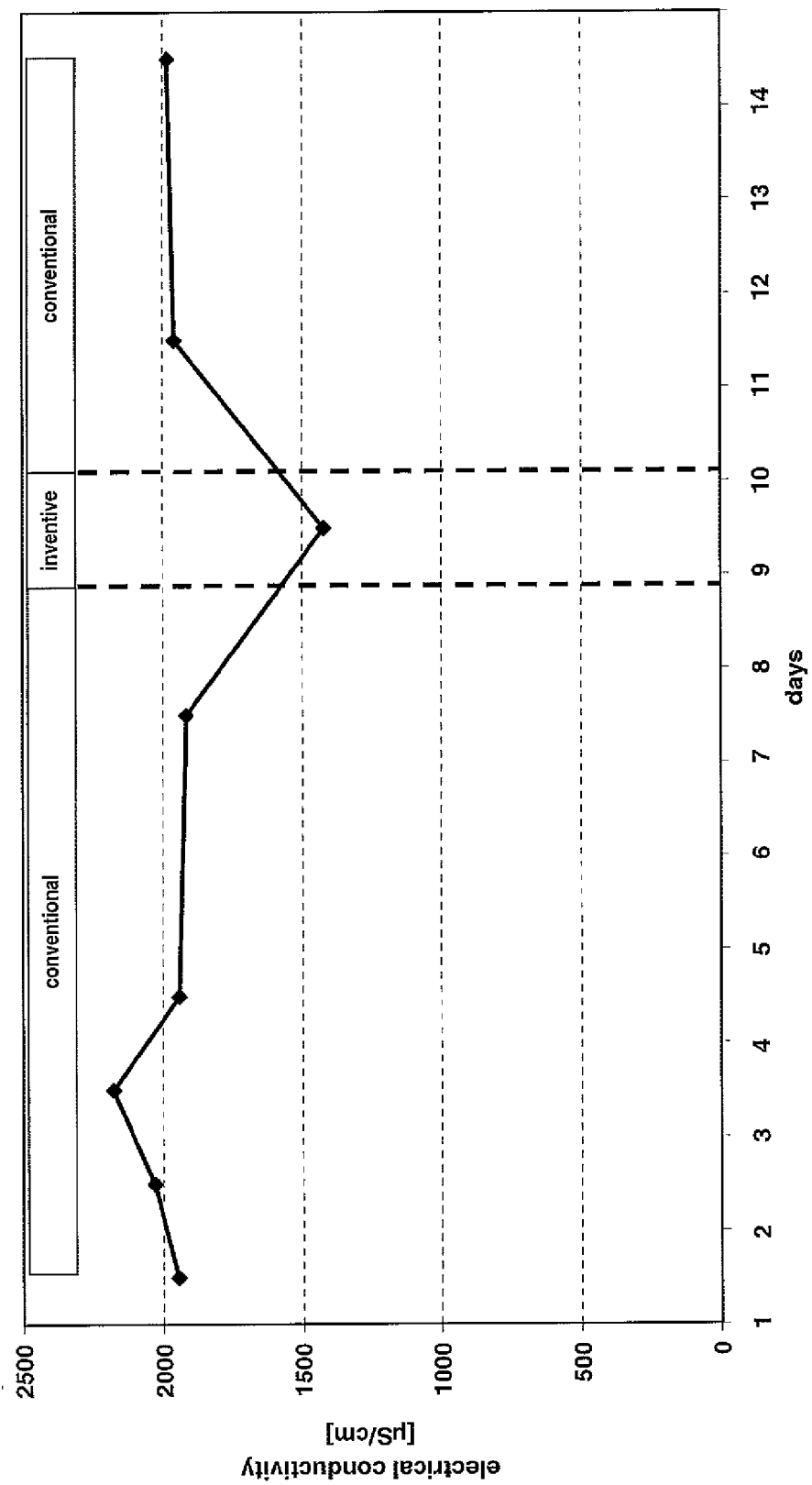
FIG. 2 shows an experiment conducted on a paper mill where increasing the biocide dosage immediately resulted in a substantial decrease of electrical conductivity from about 2000 µS/cm to about 1500 µS/cm within only 1 day.

FIG. 2 shows that the increase of biocide dosage immediately resulted in a substantial decrease of electrical conductivity from about 2000 µS/cm to about 1500 µS/cm within only 1 day. The dotted vertical line to the left indicates when the biocide dosage according to the invention was started, i.e. when the conventional addition of $NH_4Br$ biocide was changed to biocide addition in accordance with the invention, and the dotted vertical line to the right indicates when the biocide dosage according to the invention was terminated, i.e. when the conventional addition of $NH_4Br$ biocide was resumed. At the time interval inbetween the two dotted vertical lines, organic biocide was added in addition to $NH_4Br$ biocide according to the invention.

Example 3

36 experiments that were conducted at 19 paper mills were analysed with respect to the performance of dry and/or wet strength polymers in dependence of the electrical conductivity. The dry and/or wet strength polymers that were employed in the experiments were two different glyoxylated polyacrylamide products (GPAM), and the dosage of GPAM varied between 1.5 and 4 kg/t db vs. the cellulosic material with an average of 2.8 kg/t db.

Figure 3:
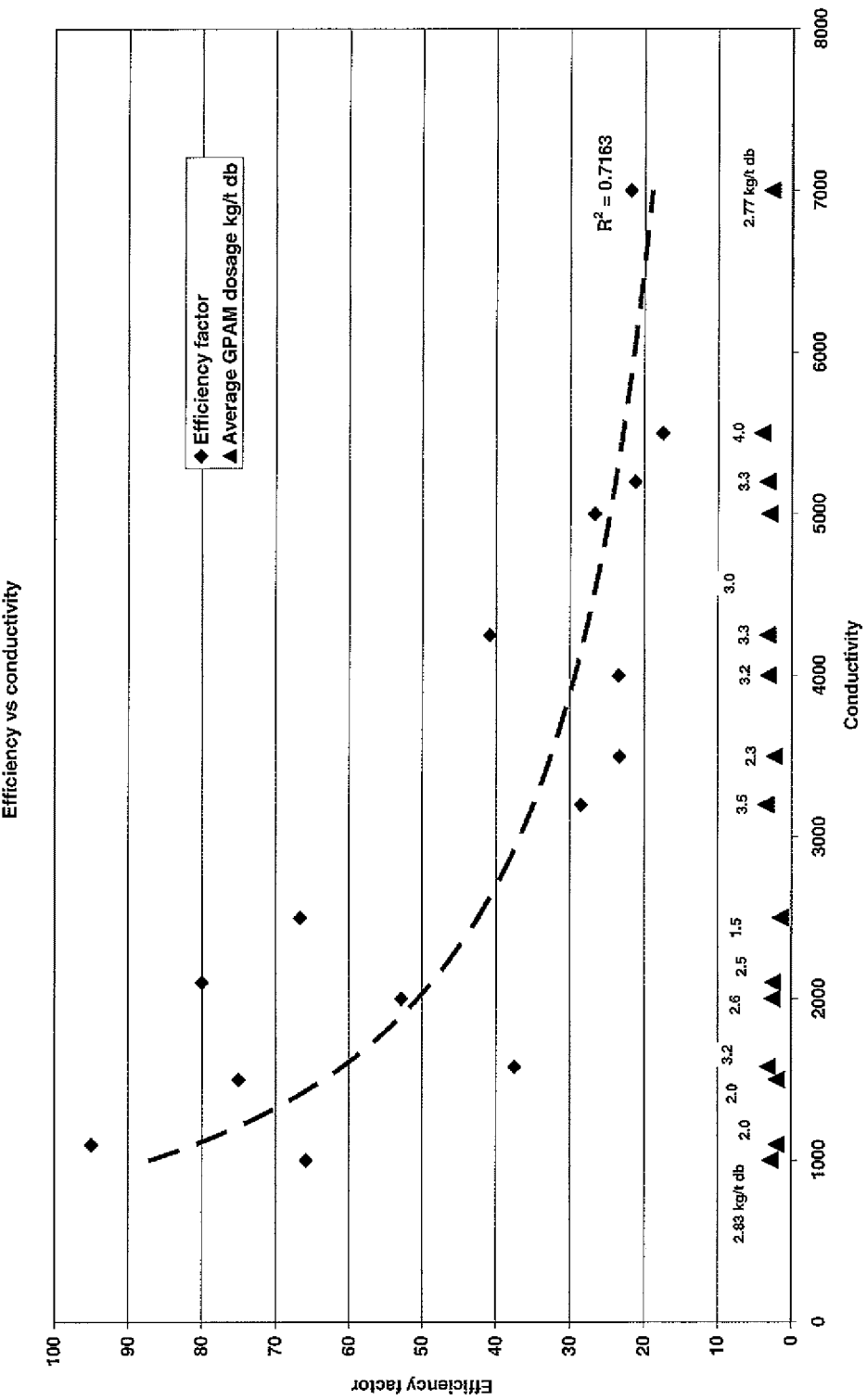
FIG. 3 shows the dependency of performance of dry and/or wet strength polymers depending upon the electrical conductivity of the aqueous phase of the cellulosic material. The performance of the dry and/or wet strength polymer is expressed in terms of an efficiency ratio that takes into account the increase of CMT, burst strength, tensile strength and dosage of dry and/or wet strength polymer.

The results are summarized in FIG. 3. The trend line has a $R^2$ value Of 0.72 (standard deviation).

FIG. 3 shows the dependency of performance of dry and/or wet strength polymers depending upon the electrical conductivity of the aqueous phase of the cellulosic material. The performance of the dry and/or wet strength polymer is expressed in terms of an efficiency ratio that takes into account the increase of CMT (result of the concora medium test), burst strength, tensile strength and dosage of dry and/or wet strength polymer. The efficiency was calculated in dependence of the strength increase in % and the dosage of the dry and/or wet strength polymer. A high dosage of dry and/or wet strength polymer with a low increase in paper strength gives a poor efficiency, whereas a low dosage of dry and/or wet strength polymer with a high increase of paper strength gives a good efficiency.

It is clear from FIG. 3 that the efficiency ratio is much better when the electrical conductivity is low whatever the dosage. As can be seen from the experimental data, particularly from the plot of the efficiency ratio vs. the electrical conductivity of the wet end: a low electrical conductivity results in a high efficiency of the dry and/or wet strength polymer, whereas a high electrical conductivity results in a low efficiency of the dry and/or wet strength polymer.

Accordingly, when reducing the electrical conductivity by means of the biocide addition according to the invention, the performance of the dry and/or wet strength polymer can be surprisingly increased.

Example 4

This experiment was conducted at a paper mill in order to further demonstrate the advantages of the invention under industrial conditions.

A comparative trial C was run without full loop biocide control so that the equilibrated electrical conductivity was 3500 µS/cm.

An inventive trial I was run with full loop biocide control (biocide Spectrum® XD3899, Ashland Inc.; added at pulper dilution water, white water 1 and 2, and clarified shower water), so that the equilibrated electrical conductivity was 1950 µS/cm.

Every trial included an experiment in the absence of strength aid ("$C_0$" and "$I_0$", respectively) as well as an experiment in the presence of strength aid ("$C_{GPAM}$" and "$I_{GPAM}$", respectively).

All other experimental parameters were kept constant. The experimental results are shown in table 7 here below:

TABLE 7

| grade: | Comparative Trial (186 g/m²) | | | Inventive Trial (186 g/m²) | | |
|---|---|---|---|---|---|---|
| | $C_O$ | $C_{GPAM}$ | % gain | $I_0$ | $I_{GPAM}$ | % gain |
| furnish (CEPI standard) (Cepi 1.05 = old corrugated containers) | 1.05 | 1.05 | | 1.05 | 1.05 | |
| basis weight average: | 183.7 | 185.8 | | 184.8 | 185.4 | |
| humidity: | 8.0 | 8.0 | | 8.0 | 8.5 | |
| conductivity μS/cm short loop: | 3500 | 3500 | (*) | 1950 | 1950 | |
| ORP short loop mV | −453 | −453 | (*) | 45 | 54 | |
| pH short loop | 6.24 | 6.24 | (*) | 6.93 | 6.93 | |
| ATP short loop | 158120 | 158120 | (*) | 23572 | 27476 | |
| GPAM g/t active | 0 | 1731 | | 0 | 1734 | |
| GPAM dosing point top layer | — | level box | | — | level box | |
| GPAM dosing point bottom layer | — | level box | | — | level box | |
| NH₄Br biocide[1] | 0 | 0 | | 0.016 | 0.016 | |
| NH₄Br biocide dosing points | — | — | | pulper dilution water; white water 2; white water 1; clarified shower water | | |
| retention aid top layer | cat. PAM | cat. PAM | | cat. PAM | cat. PAM | |
| retention aid bottom layer: | cat. PAM | cat. PAM | | cat. PAM | cat. PAM | |
| retention aid g/ton top layer: | 500 | 500 | | 500 | 500 | |
| retention aid g/ton bottom layer: | 500 | 500 | | 500 | 500 | |
| Burst kPa | 482 | 494 | 2.5 | 488 | 550 | 12.6 |
| SCT q kN/m | 3.30 | 3.44 | 4.3 | 3.33 | 3.66 | 9.9 |

[1]Spectrum ® XD3899, dosage [concentration of active substance equivalent to elemental chlorine, expressed in % active substance as Cl₂ per ton produced paper]
(*) measured once at trial It becomes clear from the above experimental results that due to the full loop biocide control in inventive example I
the electrical conductivity decreased from 3500 μS/cm ($C_0$ and $C_{GPAM}$) to 1950 μS/cm ($I_0$ and $I_{GPAM}$);
the oxygen reduction potential (ORP) in the short loop increased from −453 mV ($C_0$ and $C_{GPAM}$) to +45 ($I_0$ and $I_{GPAM}$);
the pH value in the short loop increased from 6.24 ($C_0$ and $C_{GPAM}$) to 6.93 ($I_0$ and $I_{GPAM}$);
the ATP level in the short loop decreased from about 158,000 ($C_0$ and $C_{GPAM}$) to about 25,000 ($I_0$ and $I_{GPAM}$).

Furthermore, it becomes clear that in the absence of the full loop biocide control, the GPAM strength aid improves
the burst value by only 2.5% ($C_0$=482 kPa; $C_{GPAM}$=494 kPa); and
the short span compression (SCT) by only 4.3% ($C_0$=3.30; $C_{GPAM}$=3.44).

Under the conditions of the present invention, however, the performance of the strength aid is substantially better than under the comparative conditions. Under full loop biocide control, the GPAM strength aid improves
the burst value by 12.6% ($I_0$=488 kPa; $I_{GPAM}$=550 kPa); and
the short span compression (SCT) by 9.9% ($I_0$=3.33; $I_{GPAM}$=3.66).

The invention claimed is:

1. A method for manufacturing paper, paperboard or cardboard comprising the steps of
   (a) pulping an aqueous cellulosic material containing a starch;
   (b) preventing at least a portion of the starch from being microbially degraded by treating the aqueous cellulosic material containing the starch with one or more biocides, which are at least partially added to the cellulosic material in the thick stock area, where the cellulosic material has a stock consistency of at least 2.0%; and
   (h) adding a dry and/or wet strength polymer to the cellulosic material; and
   wherein the one or more biocides are continuously or discontinuously added to the cellulosic material in quantities so that after 1 month of treatment on a continuously operating papermaking plant,
   the electrical conductivity of the aqueous cellulosic material has been decreased by at least 5%, compared to the electrical conductivity that was measured at the same location of the papermaking machine immediately before biocide was added for the first time; and/or
   pH value of the aqueous phase of the cellulosic material has been increased by at least 0.2 pH units, compared to the pH value that was measured at the same location of the papermaking machine immediately before biocide was added for the first time.

2. The method of claim 1, wherein the one or more biocides are dosed in an amount of at least 5.0 g/ metric ton, based on the total amount of the composition containing the cellulosic material and the starch.

3. The method of claim 1, wherein the one or more biocides are oxidative and/or comprise two components.

4. The method of claim 1, wherein the one or more biocides comprise an inorganic ammonium salt in combination with a halogen source.

5. The method of claim 1 wherein a further biocide is added to the cellulosic material which differs from the one or more biocides added in step (b).

6. The method of claim 5, wherein the further biocide is added in at least one of section (I) or (II); and is optionally added in section (III) and/or (IV) of a papermaking plant comprising a papermaking machine, wherein section (I)

includes measures taking place before pulping; section (II) includes measures associated with pulping; section (III) includes measures taking place after pulping but still outside the papermaking machine; and section (IV) includes measures taking place inside the papermaking machine.

7. The method of claim 5, wherein the further biocide is non-oxidizing.

8. The method of claim 5, wherein the further biocide is an organic biocide selected from the group consisting of quaternary ammonium compounds, benzyl-$C_{12-16}$-alkyldimethyl chlorides (ADBAC), polyhexamethylenebiguanide (biguanide), 1,2-benzisothiazol-3(2H)-one (BIT), bronopol (BNPD), bis(trichloro-methyl)sulfone, diiodomethyl-p-tolylsulfone, bronopol/quaternary ammonium compounds, benzyl-$C_{12-16}$-alkyldimethyl chlorides (BNPD/ADBAC), bronopol/didecyl-dimethylammonium chloride (BNPD/DDAC), bronopol/5-chloro-2-methyl-2H-isothiazol-3-one/2-methyl-2H-isothiazol-3-one (BNPD/Iso), NABAM/sodium dimethyldithio-carbamate, sodiumdimethyldithiocarbamate-N,N-dithiocarbamate (NABAM), sodium-methyldithiocarbamate, sodium dimethyldithiocarbamate, 5-chloro-2-methyl-4-isothiazolin-3-one (CMIT), 2,2-dibromo-2-cyanoacetamide (DBNPA), DBNPA/bronopol/iso (DBNPA/BNPD/Iso), 4,5-dichloro-2-n-octyl-3-isothiazolin-3-one (DCOIT), didecyl-dimethylammonium chloride (DDAC), didecyldimethylammoniumchloride, alkyl-dimethylbenzylammoniumchloride (DDAC/ADBAC), dodecylguanidine monohydro-chloride/quaternary ammonium compounds, benzyl-$C_{12-16}$-alkyldimethyl chlorides (DGH/ADBAC), dodecylguanidine monohydrochloride/methylene dithiocyanate (DGH/MBT), gluteraldehyde (Glut), gluteraldehyde/quaternary ammonium compounds/benzylcoco alkyldimethyl chlorides (Glut/coco), gluteraldehyde/didecyldimethyl-ammonium chloride (Glut/DDAC), gluteraldehyde/5-chloro-2-methyl-2H-isothiazol-3-one/2-methyl-2H-isothiazol-3-one (Glut/Iso), gluteraldehyde/methylene dithiocyanate (Glut/MBT), 5-chloro-2-methyl-2H-isothiazol-3-one/2-methyl-2H-isothiazol-3-one (Iso), methylene dithiocyanate (MBT), 2-methyl-4-isothiazolin-3-one (MIT), methamine oxirane (methamine oxirane), sodium bromide (NaBr), nitromethylidynetrimethanol, 2-n-octyl-3-isothiazolin-3-one (OIT), bis (trichloromethyl) sulphone/quaternary ammonium compounds, benzyl-$C_{12-16}$-alkyldimethyl chlorides (sulphone/ADBAC), symclosene, terbuthylazine, dazomet (thione), tetrakis(hydroxymethyl)phosphonium sulphate(2:1) (THPS) and p-[(diiodomethyl)sulphonyl]toluene (tolyl sulphone), and mixtures thereof.

9. The method of claim 8, wherein the further biocide is an organic biocide selected from the group consisting of quaternary ammonium compounds, 1,2-benzisothiazol-3(2H)-one (BIT), bronopol/5-chloro-2-methyl-2H-isothiazol-3-one/2-methyl-2H-isothiazol-3-one (BNPD/Iso), 5-chloro-2-methyl-4-isothiazolin-3-one (CMIT), DBNPA/bronopol/iso (DBNPA/BNPD/Iso), 4,5-dichloro-2-n-octyl-3-isothiazolin-3-one (DCOIT), gluteraldehyde/5-chloro-2-methyl-2H-isothiazol-3-one/2-methyl-2H-isothiazol-3-one (Glut/Iso), 5-chloro-2-methyl-2H-isothiazol-3-one/2-methyl-2H-isothiazol-3-one (Iso), 2-methyl-4-isothiazolin-3-one (MIT), 2-n-octyl-3-isothiazolin-3-one (OIT), and mixtures thereof.

10. The method of claim 8, wherein the further biocide is an organic biocide selected from the group consisting gluteraldehyde (Glut), gluteraldehyde/quaternary ammonium compounds/benzylcoco alkyldimethyl chlorides (Glut/coco),gluteraldehyde/ didecyldimethyl-ammonium chloride (Glut/DDAC), gluteraldehyde/5-chloro-2-methyl-2H-isothiazol-3-one/2-methyl-2H-isothiazol-3-one (Glut/Iso), gluteraldehyde/methylene dithiocyanate (Glut/MBT), and mixtures thereof.

11. The method of claim 1, wherein the dry and/or wet strength polymer comprises non-ionic, anionic, cationic or amphoteric cellulose reactive polymers capable of forming covalent inter-polymer cross-linkages with cellulose through aldehyde functional groups and/or 3-hydroxy-azetidinium functional groups of the dry and/or wet strength polymer.

12. The method according to claim 11, wherein the non-ionic, anionic, cationic or amphoteric cellulose reactive polymers are reaction products of ionic or nonionic homo- or copolymers comprising monomer units derived from vinylamides, which are optionally fully or partially hydrolyzed, and/or from (meth)acrylamides with epichlorohydrin or with cellulose reactive agents comprising at least one aldehyde functional group; or of polysaccharides with epichlorohydrin or with cellulose reactive agents comprising at least one aldehyde functional group.

13. The method of claim 12, wherein the cellulose reactive agents comprise at least two aldehyde functional groups selected from the group consisting of glyoxal, glutaraldehyde, succinaldehyde, furan dialdehyde, 2-hyroxyadipaldehyde, dialdehyde starch, and combinations thereof.

14. The method of claim 1, wherein the dry and/or wet strength polymer comprises a natural or synthetic non-ionic, anionic, cationic or amphoteric polymer.

15. The method of claim 14, wherein the natural or synthetic non-ionic, anionic, cationic or amphoteric polymers are selected from the group consisting of a) native or chemically modified polysaccharides; b) anionic homo- or copolymers comprising anionic monomer units derived from (meth) acrylic acid; optionally in combination with non-ionic monomer units derived from (meth)acrylamide; c) cationic homo- or copolymers comprising cationic monomer units derived from vinylamine, polydiallyldimethylammonium chloride, 2-acryloylethyltrimethylammonium chloride, and/or ethyleneimine; optionally in combination with non-ionic monomer units derived from vinylamide and/or (meth)acrylamide; d) amphoteric polymers; e) substantially nonionic water-soluble polymers; and f) water-insoluble latexes.

16. The method of claim 14, wherein the natural or synthetic non-ionic, anionic, cationic or amphoteric polymers comprise anionic homo- or copolymers comprising anionic monomer units derived from (meth)acrylic acid.

17. The method of claim 14, wherein the natural or synthetic non-ionic, anionic, cationic or amphoteric polymers comprise cationic homo- or copolymers comprising cationic monomer units derived from at least one monomer selected from vinylamine, polydiallyldimethylammonium chloride, 2-acryloylethyltrimethylammonium chloride, and ethyleneimine.

18. The method of claim 1, which is performed on a continuously operating papermaking plant, further comprising the steps:
(A) measuring a property of the aqueous cellulosic material selected from the group consisting of electrical conductivity, redox potential, pH value, concentration of ATP, and concentration of free starch; at said location of the papermaking machine;
(B) manufacturing paper, paperboard or cardboard by the method of claim 1 comprising steps (a), (b), and (h);
(C) measuring the same property as measured in step (A) at the same location as step (A), after time, delta T, wherein delta T is at least 1 and comparing the value measured in step (C) with the value measured in step (A); and (D) regulating the dosage of biocide added in step (b) and/or the dosage of dry and/or wet strength polymer added in step (h) in dependence of the result of the comparison made in step (C).

* * * * *